United States Patent
Bae

(10) Patent No.: US 10,141,769 B2
(45) Date of Patent: Nov. 27, 2018

(54) WIRELESS POWER TRANSFER SYSTEM

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 374 days.

(21) Appl. No.: 14/869,258

(22) Filed: Sep. 29, 2015

(65) Prior Publication Data

US 2016/0094048 A1    Mar. 31, 2016

(30) Foreign Application Priority Data

Sep. 30, 2014  (KR) .................. 10-2014-0131462

(51) Int. Cl.
| | | |
|---|---|---|
| H01F 27/42 | (2006.01) | |
| H01F 37/00 | (2006.01) | |
| H01F 38/00 | (2006.01) | |
| H02J 7/02 | (2016.01) | |
| H02J 7/00 | (2006.01) | |
| H02J 50/12 | (2016.01) | |

(52) U.S. Cl.
CPC .............. *H02J 7/025* (2013.01); *H02J 7/007* (2013.01); *H02J 50/12* (2016.02)

(58) Field of Classification Search
CPC ... B60L 11/18; H02J 5/005; H02J 5/00; H02J 17/00
USPC ..... 307/104, 149, 66, 64; 320/108, 137, 149
See application file for complete search history.

(56) References Cited

U.S. PATENT DOCUMENTS

| | | | |
|---|---|---|---|
| 8,441,154 B2 | 5/2013 | Karalis et al. | |
| 9,660,486 B2* | 5/2017 | Lee | H02J 50/12 |
| 9,789,777 B2* | 10/2017 | Mi | B60L 11/182 |
| 2012/0161696 A1* | 6/2012 | Cook | B60L 11/182 |
| | | | 320/108 |
| 2012/0235636 A1* | 9/2012 | Partovi | H02J 7/025 |
| | | | 320/108 |
| 2013/0076306 A1 | 3/2013 | Lee et al. | |
| 2014/0009109 A1 | 1/2014 | Lee et al. | |
| 2014/0015522 A1* | 1/2014 | Widmer | G01D 5/2006 |
| | | | 324/239 |
| 2014/0191593 A1 | 7/2014 | Moh | |

(Continued)

FOREIGN PATENT DOCUMENTS

| | | |
|---|---|---|
| JP | 2013-153636 A | 8/2013 |
| KR | 10-2013-0033867 A | 4/2013 |

(Continued)

*Primary Examiner* — Rexford Barnie
*Assistant Examiner* — Jagdeep Dhillon
(74) *Attorney, Agent, or Firm* — Birch, Stewart, Kolasch & Birch, LLP

(57) ABSTRACT

Disclosed is a wireless power transfer system-charger for wireless power transmission. The wireless power transfer system-charger includes: a power converting unit to convert a DC signal into an AC signal; a control unit to control the power converting unit with a first or second operating frequency; and an induction-type antenna system and a resonance-type antenna system connected in parallel to each other, wherein power is transmitted through the induction-type antenna system or the resonance-type antenna system according to a control of the control unit.

14 Claims, 22 Drawing Sheets

(56) References Cited

U.S. PATENT DOCUMENTS

| | | | |
|---|---|---|---|
| 2015/0015197 A1* | 1/2015 | Mi | B60L 11/182 |
| | | | 320/108 |
| 2015/0054452 A1* | 2/2015 | Ahn | H02J 5/005 |
| | | | 320/108 |
| 2015/0137746 A1* | 5/2015 | Lee | H02J 5/005 |
| | | | 320/108 |
| 2015/0171931 A1 | 6/2015 | Won et al. | |
| 2015/0357827 A1* | 12/2015 | Muratov | H02J 50/10 |
| | | | 307/104 |

FOREIGN PATENT DOCUMENTS

| | | |
|---|---|---|
| KR | 10-2014-0007273 A | 1/2014 |
| KR | 10-2014-0017739 A | 2/2014 |
| KR | 10-2014-0089187 A | 7/2014 |
| KR | 10-2014-0095348 A | 8/2014 |

\* cited by examiner

WIRELESS POWER TRANSFER SYSTEM

BACKGROUND

The embodiment relates to a wireless power transfer system.

Generally, various kinds of electronic appliances employ batteries and are driven by using the power charged in the batteries. In this case, the battery of an electron appliance may be exchanged or may be recharged. The electronic appliance may include a contact terminal for making contact with an external charging apparatus in order to charge the battery. That is, the electronic appliance is electrically connected to the charging apparatus through the contact terminal. However, the contact terminal may be exposed to an outside of the electronic appliance, so that the contact terminal may be contaminated or shot-circuited due to moisture. In this case, a contact error may be generated between the contact terminal and the charging apparatus, so that the battery of the electronic appliance may not be charged.

To solve the above-described problems, wireless power transfer (WPT) for wirelessly charging an electronic appliance had been proposed.

The wireless power transmission system, which is a technique of transferring power through space without any wires, maximizes the convenience of supplying power to mobile appliances and digital home appliances.

The wireless power transmission system may save energy through real-time power using control, overcome a spatial restriction on power supply and reduce consuming power by using the recharging of a battery.

A scheme of implementing a wireless power transmission system is typically classified into a magnetic induction scheme and a magnetic resonance scheme. The magnetic induction scheme, which is a contactless energy transmission technique which generates electromotive force at one coil through the medium of a magnetic flux generated by allowing two coils to approach closely to each other and current to flow through the other coil, may utilize a frequency of several hundreds of kHz. The magnetic resonance scheme, which is a magnetic resonance technique which uses an electric or magnetic field without using any electromagnetic waves or electric currents, may have a transmissible distance of several meters or more and use a bandwidth of several tens of MHz.

Meanwhile, a wireless power transfer system includes a wireless power transfer system-charger of wirelessly transmitting power and a wireless power transfer system-receiver of wirelessly receiving power to charge a load such as a battery. In this case, a charging scheme of the wireless power transfer system-receiver, that is, at least one of the magnetic induction scheme and the magnetic resonance scheme is selected and a wireless power transfer system-charger capable of transferring power corresponding to the charging scheme of the wireless power transfer system-receiver is required to be developed.

SUMMARY

The embodiment provides a wireless power transfer system including a wireless power transfer system-charger having a charging scheme variable according to a frequency corresponding to the wireless power transfer system-receiver having a magnetic induction or resonance scheme.

The embodiment provides a wireless power transfer system including a wireless power transfer system-charger capable of controlling an induction coil for a magnetic induction scheme and a resonant coil for a magnetic resonance scheme with a single power converting unit.

According to one embodiment, there is provided a wireless power transfer system-charger for wireless power transmission, which includes: a power converting unit to convert a DC signal into an AC signal; a control unit to control the power converting unit with a first or second operating frequency; and an induction-type antenna system and a resonance-type antenna system connected in parallel to each other, wherein power is transmitted through the induction-type antenna system or the resonance-type antenna system according to a control of the control unit.

The induction-type antenna system includes an induction coil and a parasitic capacitor formed by the induction coil, and the resonance-type antenna system is operated at an operating frequency which is determined by the induction coil and the parasitic capacitor connected in parallel to the induction coil.

The resonance-type antenna system has impedance higher than the induction-type antenna system at the first operating frequency, and the induction-type antenna system has impedance higher than the resonance-type antenna system at the second operating frequency.

The power converting unit includes: a first high-frequency filtering unit connected between a first node and a second node; a second high-frequency filtering unit connected between the first node and a third node; a first power converting switch unit connected among the second node, a fifth node and a sixth node; and a second power converting switch unit connected among the third node, the fifth node and a seventh node, and the induction-type antenna system and the resonance-type antenna system are connected between the sixth and seventh nodes.

The power converting unit provides a first signal transmission path including the second node, the sixth node, seventh node and the fifth node according to a first switch control signal from the control unit, and a second signal transmission path including the third node, the seventh node, the sixth node and the fifth node, according to a second switch control signal from the control unit.

According to another embodiment, there is provided a wireless power transfer system-charger for wireless power transmission, which includes a power converting unit to convert DC signals on a first node and a fifth node into AC signals and output the AC signals to a sixth node and a seventh node; a control unit to control the power converting unit; and a transmission antenna system connected between the sixth nod and the seventh node, wherein the power converting unit includes: a first high-frequency filtering unit connected between the first node and a second node; a second high-frequency filtering unit connected between the first node and a third node; a first power converting switch unit including a first switch connected between the second node and the sixth node, and a second switch connected between the sixth node and the fifth node; and a second power converting switch unit including a third switch connected between the third node and the seventh node, and a fourth switch connected between the seventh node and the fifth node.

The first high-frequency filtering unit includes a fifth inductor and the second high-frequency filtering unit includes a sixth inductor.

The transmission antenna system includes an induction-type antenna system and a resonance-type antenna system connected in parallel to the induction-type antenna system.

The control unit controls the first and fourth switches to be switched into a same phase, the second and third switches to be switched into a same phase, and the first and second switches to be switched into opposite phases based on a first operating frequency.

The first operating frequency is in a range of 100 kHz to 350 kHz, and power is transmitted from the induction-type antenna system in a magnetic induction scheme.

The control unit controls the first and third switches to be maintained in a turn-on state, and controls the second and third switches to be switched into mutually opposite phases.

The second operating frequency is equal to 6.78 MHz, and power is transmitted from the resonance-type antenna system in a magnetic resonance scheme.

The induction-type antenna system includes an induction coil and an induction matching unit, and the induction matching unit includes: a first capacitor connected between one end of the induction coil and an eighth node; a second capacitor connected between a ninth node which is an opposite end of the induction coil and the eighth node; a second inductor connected between the sixth node and the eighth node; and a third inductor connected between the seventh node and the ninth node.

The resonance-type antenna system includes a resonant coil and a resonance matching unit, and the resonance matching unit includes: a third capacitor connected in parallel to the resonant coil connected between a tenth node and an eleventh node; a fourth capacitor connected between the sixth node and the tenth node; and a fifth capacitor connected between the seventh node and the eleventh node.

The second and third inductors have an inductance value equal to an inductance value of the third inductor.

The first capacitor has capacitance equal to capacitance of the second capacitor.

The fourth capacitor has capacitance equal to capacitance of the fifth capacitor.

The induction coil has inductance greater than inductance of the resonant coil.

The third capacitor has capacitance less than capacitance of the fourth capacitor, and the fourth capacitor has capacitance less than capacitance of the first capacitor.

The fifth and sixth inductors have inductance in range of 0.1 uH to 5 uH.

According to the embodiments, a wireless power transfer system including a wireless power transfer system-charger, a charging scheme of which is changed with a frequency corresponding to the wireless power transfer system-receiver of a magnetic induction or resonance scheme, may be provided. In addition, an induction coil for a magnetic induction scheme and a resonant coil for a magnetic resonance scheme may be controlled by using a single power converting unit, so that all the magnetic induction and resonance schemes may be controlled by using the single power converting unit. Therefore, the circuit complexity may be reduced and the yield and price competiveness may be improved.

DETAILED DESCRIPTION OF THE EMBODIMENTS

Figure 1:
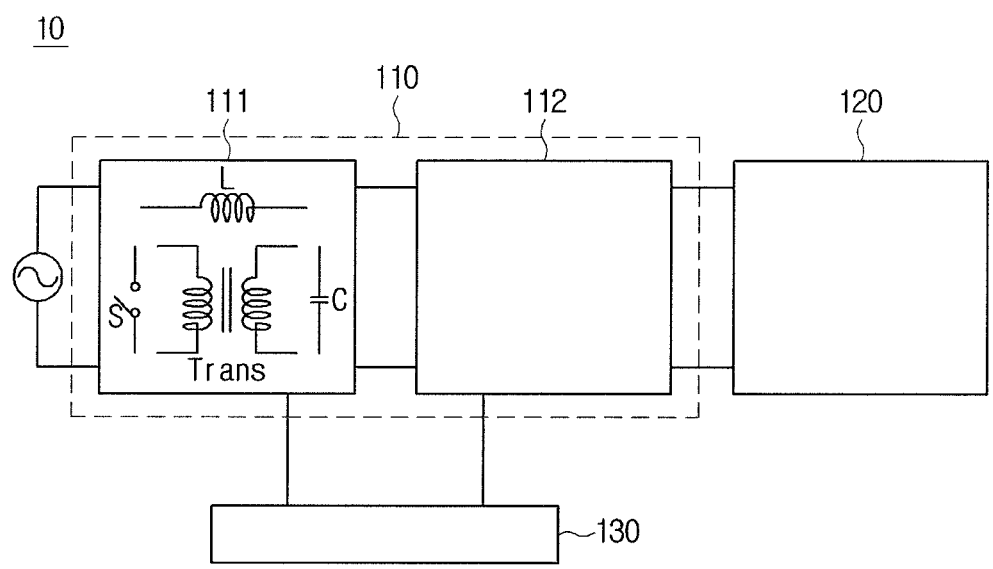
FIG. 1 is a block diagram showing a wireless power transfer system-charger of a wireless transfer system according to an embodiment.

Hereinafter, a wireless power transfer system according to an embodiment will be described with reference to accompanying drawings. Although embodiments have been described with reference to a number of illustrative embodiments thereof, it should be understood that numerous other modifications and embodiments can be devised by those skilled in the art that will fall within the spirit and scope of the principles of this disclosure. The thickness and size of an apparatus shown in the drawings may be exaggerated for the purpose of convenience or clarity. The same reference numerals denote the same elements throughout the specification.

The embodiment selectively uses various types of frequency bandwidths in the range of a low frequency wave (50 kHz) to a high frequency wave (15 MHz) for wireless power transmission, and is required to be supported by a communication system which is capable of exchanging data and control signals for system control.

The embodiment can be employed in various industrial fields, such as a mobile terminal industry, a smart clock industry, a computer and laptop industry, an electronic device industry, an electric vehicle industry, a medical device industry, a robot industry, etc.

The embodiment may include a system capable of transmitting power to one or more devices by using one or multiple transmission coils constituting the device Definitions and abbreviations used in the embodiment are as follows.

Wireless Power Transfer System: Wireless Power Transfer System: A system for wirelessly transmitting power in a magnetic field region.

Wireless Power Transfer System-Charger: Wireless Power Transfer System-Charger: An apparatus for wirelessly transmitting power to multiple power devices in a magnetic field region and for managing the entire system.

Wireless power transfer system-receiver: Wireless power transfer system-receiver: An apparatus for wirelessly receiving power from a wireless power transfer system-charger in a magnetic field region.

Charging Area: Charging Area: An area in which power is wirelessly transmitted in a magnetic field region, and which may vary according to a size of an application product, required power and an operating frequency.

Figure 2:
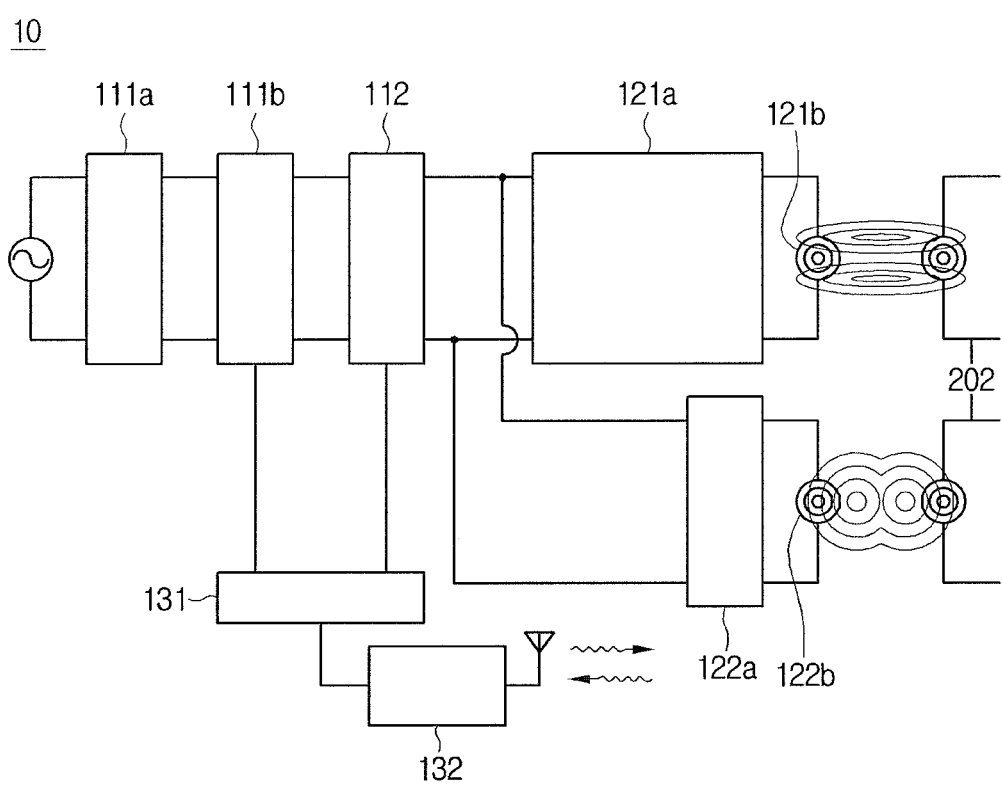
FIG. 2 is a block diagram showing in detail a sub-system of a wireless transfer system of FIG. 1.
Figure 3:
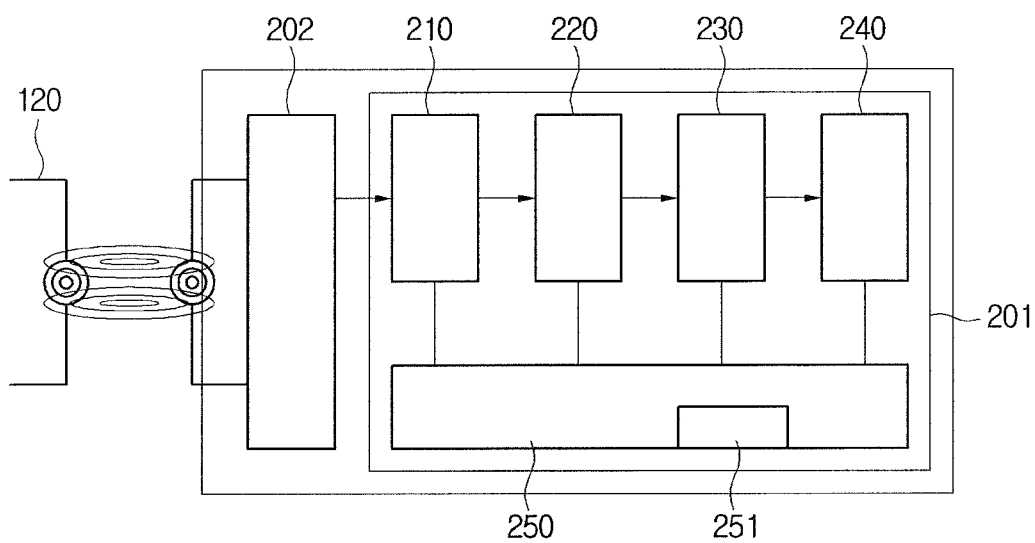
FIG. 3 is a block diagram showing a wireless power transfer system-receiver of a wireless transfer system according to an embodiment.

FIG. 1 is a block diagram showing a wireless power transfer system-charger of a wireless transfer system according to an embodiment. FIG. 2 is a block diagram showing in detail a sub-system of a wireless transfer system of FIG. 1. FIG. 3 is a block diagram showing a wireless power transfer system-receiver of a wireless transfer system according to an embodiment.

Referring to FIGS. 1 to 3, a wireless power transmission system 10 according to an embodiment may include a wireless power transfer system-charger 100 for wirelessly transmitting power and a wireless power transfer system-receiver (device, receiving unit, receiving device, receiving module) 200 for receiving power from the wireless power transfer system-charger 100.

<Wireless Power Transfer System-Charger According to Embodiment>

As shown in FIG. 1, the wireless power transfer system-charger 100 may include a transmission power converter system 110, a transmission antenna system 120 and a communication and control system 130 as sub-systems.

Examining an energy flow of the wireless power transfer system-charger 100, an AC input signal may be converted into a DC signal. Then, the converted DC signal may be converted into an AC signal. The converted AC signal may be transmitted to the wireless power transfer system-receiver 200 in one of a magnetic induction scheme and an energy resonance scheme by using the transmission antenna system 120. In addition, when the AC input signal is converted into the DC signal, a level of the DC signal may be varied under control of the communication and control system 130. When the converted DC signal is converted into the AC signal, a level and frequency of the AC signal may be varied under control of the communication and control system 130.

The transmission power converter system 110 may include a converter 111 and a power converting unit 112 as sub-systems thereof. The converter 111 may convert the AC input signal into the DC signal and the power converting unit 112 may convert the converted DC signal into the AC signal to output the AC signal to the transmission antenna system 120.

Referring to FIG. 2, the converter 111 may include a rectifying and filtering unit 111a and a DC-DC converter 111b as sub-systems thereof. However, the embodiment is not limited to the above and the convert 111 may be configured only by the DC-DC converter 111b.

The rectifying and filtering unit 111a generates the DC signal which is used by the DC-DC converter 111b and removes noise from the generated DC signal. A level of the generated DC signal is converted into a required level by the DC-DC converter 111b and is supplied to the transmission antenna system 120 as the power of the transmission antenna system 120.

The rectifying and filtering unit 111a a may include one of a diode rectifier configured by diodes, a switching rectifier configured by switching devices and a hybrid rectifier configured by diodes and switching devices, and a filter configured by inductors and capacitors.

The DC-DC converter 111b is a kind of power converter which converts a DC signal into the DC signal required by a load. The DC-DC converter 111b includes a switching device S having a power conversion control function, an inductor L and a capacitor C having a power conversion transit function or an output voltage smoothing function, and a transformer having a voltage gain control or an electric separation function (insulating function). The DC-DC converter 111b may perform the function of removing a ripple component or a pulsating component (an AC component included in the DC signal) included in the DC signal input thereto. In addition, the DC-DC converter 111b may be a step-down converter of supplying an output DC voltage lower than an input voltage, but the embodiment is not limited thereto. The output DC voltage of the DC-DC converter 111b may be controlled by allowing the communication and control system 130 to control an on-and-off period of the switching device S in the DC-DC converter 111b. An error between an instruction value and a real output value of the output DC voltage of the DC-DC converter 111b may be adjusted in a feedback scheme which is performed through the communication and control system 130.

The power converting unit 112 may convert a DC signal having a constant level into an AC signal according to a switching pulse signal in a bandwidth of several tens of KHz to several tens of GHz to generate power. That is, the power converting unit 112 may convert the DC voltage into the AC voltage to generate "wake-up power" or "charging power" used by a target, that is, the wireless power transfer system-receiver 200 entering the charging region. The wake-up power may signify low power of 0.1~1 mWatt, but the embodiment is not limited thereto and the wake-up power may have a lower or higher power value. Although the charging power, which is power required to charge a battery of the wireless power transfer system-receiver 200 or consumed during the operation of the wireless power transfer system-receiver 200, signifies high power of 1 mWatt~200 Watt consumed by a load of the target wireless power transfer system-receiver 200, the embodiment is not limited thereto and the charging power may have a lower or higher power value.

Meanwhile, the AC signal generated from the power converting unit 112 may be provided to at least one of an induction-type antenna system 121 and a resonance-type antenna system 122.

Meanwhile, the power converting unit 112 may include a power amplifier for amplifying the DC voltage according to a switching pulse signal. The power converting unit 112 may include a full-bridge inverter, but the embodiment is not limited thereto.

The communication and control system 130 may include a transmission control unit and a transmission communication unit 132 as sub-systems.

The transmission control unit 131 may perform a function of controlling an output voltage of the DC-DC converter 111b in consideration of an amount of required power of the wireless power transfer system-receiver 200, a current charged level and a wireless power scheme. In consideration of the maximum power transmission efficiency, the transmission control unit 131 may generate a frequency and switching waveforms for driving the power converting unit 112 such that the power to be transmitted is controlled. In addition, the transmission control unit 131 may control the overall operations of the wireless power transfer system-charger 100 by using an algorithm, a program or an application required for control and read out from a storage unit (not shown). Meanwhile, the transmission control unit 131 may be referred to as a microprocessor, a micro control unit or a micom.

The transmission communication unit 132 may communicate with a reception communication unit 251 by utilizing a communication scheme such as a Bluetooth scheme. The transmission communication unit 132 and the reception communication unit 251 may transmit/receive charging situation information and charging control instructions to/from each other. The charging situation information may include information about the number of wireless power transfer system-receivers 200, a battery residual, the number of charging times, an amount of use, a battery capacity, a battery rate, and an amount of power transmitted by the wireless power transfer system-charger 100. In addition, the transmission communication unit 132 may transmit a charging function control signal for controlling a charging function of the wireless power transfer system-receiver 200 and the wireless power transfer system-receiver 200 may be controlled according to the charging function control signal so that the charging function may be enabled or disabled.

Meanwhile, the transmission power converter system 110 may be configured by an additional module without regard to the transmission communication unit 132, so that the transmission power converter system 110 may perform communication in an out-of-band scheme. In addition, the transmission power converter system 110 and the transmission communication unit 132 may be implemented in a single hardware unit. The wireless power transfer system-receiver 200 may transmit a feedback signal to the wireless power transfer system-charger 100 by using the power signal transmitted from the wireless power transfer system-charger 100. The wireless power transfer system-charger 100 may transmit a signal to the wireless power transfer system-receiver 200 by shifting the frequency of the power signal transmitted from the wireless power transfer system-charger 100. That is, the wireless power transfer system-charger 100 may perform in-band communication. For example, the wireless power transfer system-receiver 200 may modulate the feedback signal to transfer information about a charging initiation, a charging termination, a battery state, etc., through the feedback signal to the wireless power transfer system-charger 100. In addition, the transmission communication unit 132 may be configured separately from the control unit 131 and the wireless power transfer system-receiver 200 or the reception communication 251 may be included in or configured separately from the control unit 250 of the wireless power transfer system-receiver 200.

The transmission antenna system 120 may include at least one of the induction-type antenna system 121 and the resonance-type antenna system 122.

The induction-type antenna system 121 and the resonance-type antenna system 122 may be connected in parallel to the power converting unit 112.

The induction-type antenna system 121 may include an induction matching unit 121a and an induction coil 121b and the resonance-type antenna system 122 may include a resonant matching unit 122a and a resonant coil 122b.

The matching units 121a and 122a are used to perform the impedance matching between the wireless power transfer system-charger 100 and the wireless power transfer system-receiver 200, so that the power transfer efficiency is improved. The matching units 121a and 122a, which allow reflective waves to be minimized at the points having mutually different impedances, so that signals smoothly flow therethrough, have a resonance concept including a frequency selection property. The matching units 121a and 122a may be interposed between the power converting unit 112 and the coils 121b and 122b to compensate the impedance difference between mutually different connecting ends, and each may include an inductor, a capacitor and a resistor.

Specifically, the induction matching unit 121a may have a series resonance structure or a parallel resonance structure and increase an inductive coupling factor between the wireless power transfer system-charger 100 and the wireless power transfer system-receiver 200 to minimize the energy loss. In addition, the resonance matching unit 122a can compensate for the impedance matching in real-time according to the change of the matching impedance on an energy transfer path, which is caused by a variation in the characteristics of the resonant coil 122b due to a change in the distance between the wireless power transfer system-charger 100 and the wireless power transfer system-receiver 200 or mutual influence from metallic foreign substances and plural devices. A multiple matching scheme using a capacitor, a matching scheme using multiple antennas, or a scheme using multiple loops may be utilized for the compensation.

Meanwhile, one of the induction-type antenna system 121 and the resonance-type antenna system 122 may be operated under control of the communication and control system 130.

In the magnetic induction scheme in which the induction-type antenna system 121 is operated, the converter 111 may convert an AC signal of 110 V~220 V (AC) of 60 Hz into a DC signal of 10 V~20 V, and the power converting unit 112 may convert the DC signal of 10 V~20 V into an AC signal of 100~350 kHz to provide the AC signal to the induction-type antenna system 121.

In addition, in the magnetic resonance scheme in which the resonance-type antenna system 122 is operated, the converter 111 may convert an AC signal of 110 V~220 V (AC) of 60 Hz into a DC signal of 10 V~20 V, and the power converting unit 112 may convert the DC signal of 10 V~20 V into an AC signal of 6.78 MHz to provide the AC signal to the resonance-type antenna system 122. However, the frequency and voltage values of the AC signal and the voltage value of the DC signal are not limited to the above.

Each of the induction coil 121b and the resonant coil 122b may include a plurality of coils or a single coil.

When each of the induction coil 121b and the resonant coil 122b may include a plurality of coils, the coils may overlap each other and an overlap area of the coils may be determined in consideration of a deviation of the magnetic flux density. Specifically, the induction coil 121b and the resonant coil 122b may be constructed in consideration of internal resistance and radiation resistance. The reason is because the quality factor of the transmission antenna system 120 is increased when the resistance is reduced, so that the efficiency is maximized.

<Wireless Power Transfer System-Receiver According to Embodiment>

Referring to FIG. 3, the wireless power transfer system-receiver 200 may include a reception power converter system 201 and a reception antenna system 202.

The reception antenna system 202 of the wireless power transfer system-receiver 200 may be identical to the transmission antenna system 120. The dimensions of a receiving antenna may vary according to electrical characteristics of the wireless power transfer system-receiver 200.

In addition, the reception antenna system 202 may receive power in at least one of a magnetic induction scheme and a magnetic resonance scheme. Thus, the reception antenna system 202 may include at least one of an induction coil and a resonant coil according to the power receiving scheme. In addition, the reception antenna system 202 may further include an antenna for near field communication.

The reception power converter system 201 may include a matching unit 210, a rectifying unit 220, a reception converter 230, a load 240 and a reception control unit 250. However, the matching unit 210, the rectifying unit 220 and the reception converter 230 may be configured separately from each other, or may be integrated into one configuration.

The matching unit 210 may match the impedances of the wireless power transfer system-charger 100 and the wireless power transfer system-receiver 200 to each other. The rectifying unit 220 rectifies the AC signal output from the reception antenna system 202 to generate a DC signal.

The reception converter 230 may include a DC/DC converter and may adjust a level of the DC voltage output from the rectifying unit 220 to be suitable to a capacity of the load 240.

The load 240 may include a battery, a display, an audio output circuit, a main processor and various kinds of sensors.

The reception control unit 250 may be activated by the wake-up power from the wireless power transfer system-charger 100. The reception control unit 250 may communicate with the wireless power transfer system-charger 100 and control the operation of a sub-system of the wireless power transfer system-receiver 200.

The wireless power transfer system-receiver 200 may include at least one wireless power transfer system-receiver capable of receiving energy from the wireless power transfer system-charger 100 at the same time. That is, in the wireless power transfer system having a resonance scheme, a plurality of target wireless power transfer system-receivers 200 may receive power from one wireless power transfer system-charger 100. In this case, the matching unit 121 of the wireless power transfer system-charger 100 may adaptively perform the impedance matching between the wireless power transfer system-receivers 200.

Meanwhile, when the wireless power transfer system-receiver 200 includes a plurality of wireless power transfer system-receivers, the wireless power transfer system-receivers may have the same system or different systems.

<Power Converting Unit According to Embodiment>

Figure 4:
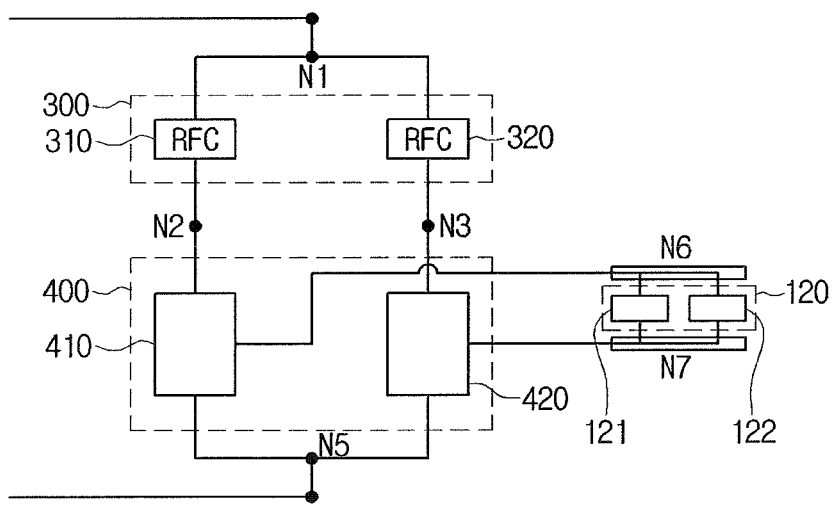
FIG. 4 is showing a power converting unit and a transmission antenna system connected to the power converting unit according to an embodiment.
Figure 5:
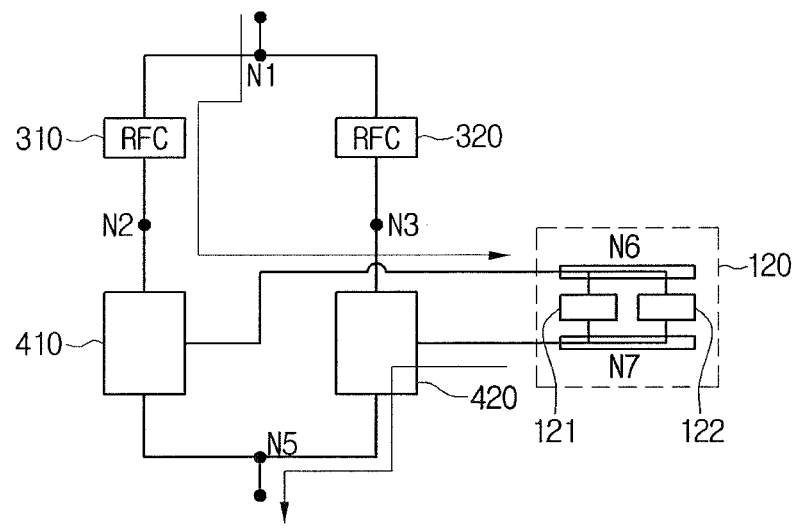
FIGS. 5 and 6 illustrates the operation of a power converting unit.
Figure 6:
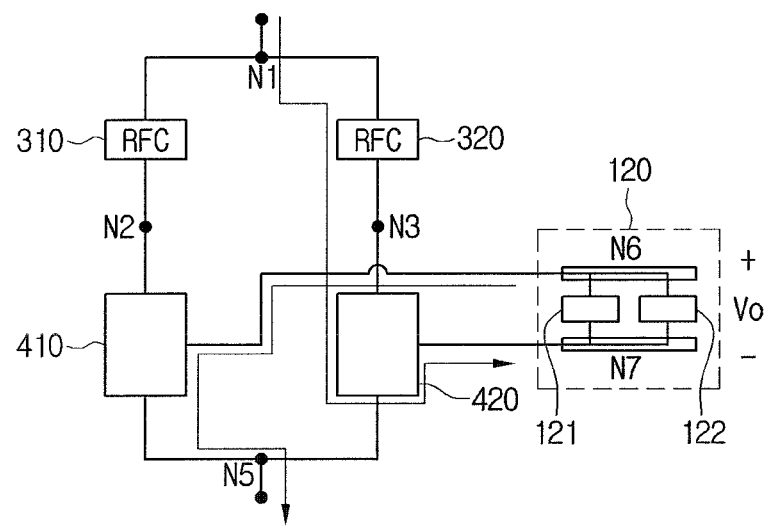

FIG. 4 is showing a power converting unit and a transmission antenna system connected to the power converting unit according to one of examples in this embodiment. FIGS. 5 and 6 illustrate the operation of the power converting unit.

Referring to FIGS. 4 to 6, the power converting unit 112 may include a high-frequency filtering unit 300 and a power converting switch unit 400 as sub-systems.

The high-frequency filtering unit 300 may include first and second high-frequency filtering units 310 and 320, and the power converting switch unit 400 may include first and second power converting switch units 410 and 420.

The first high-frequency filtering unit 310 may be connected between the first and second nodes N1 and N2, and the second high-frequency filtering unit 320 may be connected between the first and third nodes N1 and N3. The first power converting switch unit 410 may be connected between the second, fifth and sixth nodes N2, N5 and N6, and the second power converting switch unit 420 may be connected between the third, fifth and seventh nodes N3, N5 and N7. In addition, the transmission antenna system 120 may be connected between the sixth and seventh nodes N6 and N7, so that the induction-type antenna system 121 and the resonance-type antenna system 122 may be connected in parallel to each other.

The DC signal provided from the converter 111 may be provided to both the first and fifth nodes N1 and N5 of the power converting unit 112. The DC signal provided to the first and fifth nodes N1 and N5 may be converted into an AC signal through the power converting unit 112, which is provided to the sixth and seventh nodes N6 and N7. When the AC signal provided to the sixth and seventh nodes N6 and N7 is applied to the induction coil 121b of the induction-type antenna system 121, current may flows through the induction coil 121b of the induction-type antenna system 121 and electromotive force may be generated at the reception antenna system 202 of the wireless power transfer system-receiver 200 through the medium of magnetic flux generated by the flowing current. In addition, when the AC signal provided through the sixth and seventh N6 and N7 is applied to the resonance-type antenna system 122 of the transmission antenna system 120, electromotive force may be generated at the reception antenna system 202 of the wireless power transfer system-receiver 200 by an electric field or magnetic field generated from the resonant coil 122b of the resonance-type antenna system 122.

The first and second high-frequency filtering units 310 and 320 may attenuate a high-frequency signal included in the DC signal provided through the node N1, and each of the first and second high-frequency filtering units 310 and 320 may include at least one choke coil (RFC).

The first power converting switch unit 410 may provide a first signal transmission path of the second, sixth and seventh nodes N2, N6 and N7 and a third signal transmission path of the seventh, sixth and fifth nodes N7, N6 and N5 according to the switch control signal of the control unit 131.

In addition, the second power converting switch unit 420 may provide a second signal transmission path of the sixth, seventh and fifth nodes N6, N7 and N5 and a fourth signal transmission path of the third, seventh and sixth nodes N3, N7 and N6 according to the switch control signal of the control unit 131.

The switch control signal, which is provided from the control unit 131 to control the first and second power converting switch units 410 and 420, may include first and second switch control signals. The first and second power converting switch units 410 and 420 may provide the first and second signal transmission paths based on the first switch control signal from the control unit 131, and the third and fourth signal transmission paths based on the second switch control signal from the control unit 131.

The forward or reverse output voltage Vo or −Vo may be output to the transmission antenna system 120 according to the first and second switch control signals of the control unit. Thus, the power converting unit 112 may provide a signal, the polarity of which is periodically reversed, that is, an AC signal to the transmission antenna system 120 based on the DC signal and the first and second switch control signals of the control unit 131.

Meanwhile, the transmission antenna system 120 may output the output voltage Vo to one of the induction-type antenna system 121 and the resonance-type antenna system 122 according to the operating frequencies of the first and second power converting switch units 410 and 420.

The operating frequency may include first and second operating frequencies and each of the first and second frequencies may be not a specific frequency but in a specific frequency range. At the first operating frequency, the induction-type antenna system 121 connected between the sixth and seventh nodes N6 and N7 may be operated and the resonance-type antenna system 122 may have high impedance. In addition, at the second operating frequency, the resonance-type antenna system 122 connected between the sixth and seventh nodes N6 and N7 may be operated and the induction-type antenna system 121 may have high impedance. In this case, the high impedance is a relative value. The resonance-type antenna system 122 may have impedance higher than the induction-type antenna system 121 at the first operating frequency and the induction-type antenna system 121 may have impedance higher than the resonance-type antenna system 122 at the second operating frequency.

Figure 7:
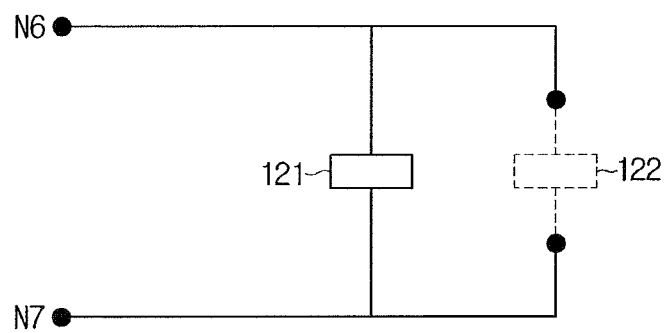
FIGS. 7 and 8 illustrates the operating relationship of a transmission antenna system according to the first and second operating frequencies.
Figure 8:
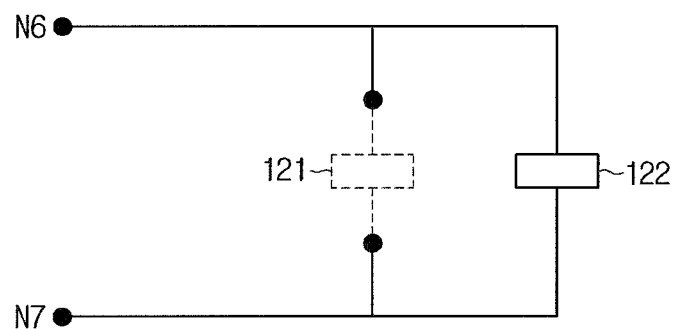

FIGS. 7 and 8 illustrate the operation of the transmission antenna system according to the first and second operating frequencies.

Referring to FIG. 7, at the first operating frequency, the resonance-type antenna system 122 may have high impedance and be operated equivalently to an open circuit. That is, since the impedance of the resonance-type antenna system 122 is higher than that of the induction-type antenna system 121 between the sixth and seventh nodes N6 and N7, the resonance-type antenna system 122 may be operated like an open circuit.

Referring to FIG. 8, at the second operating frequency, the induction-type antenna system 121 may have high impedance and be operated equivalently to an open circuit. That is, since the impedance of the induction-type antenna system 121 is higher than that of the resonance-type antenna system 122 between the sixth and seventh nodes N6 and N7, the induction-type antenna system 121 may be operated like an open circuit.

As described above, one of the induction-type antenna system 121 and the resonance-type antenna system 122 is operated like an open circuit according to the operating frequency of the switch control signal through which the transmission control unit 131 operates the power converting unit 112, so that it may be minimize for the one system to exert an influence on the operation of the other. Thus, energy may be supplied to both the induction-type antenna system 121 and the resonance-type antenna system 122 by using the single power converting unit 112.

Figure 9:
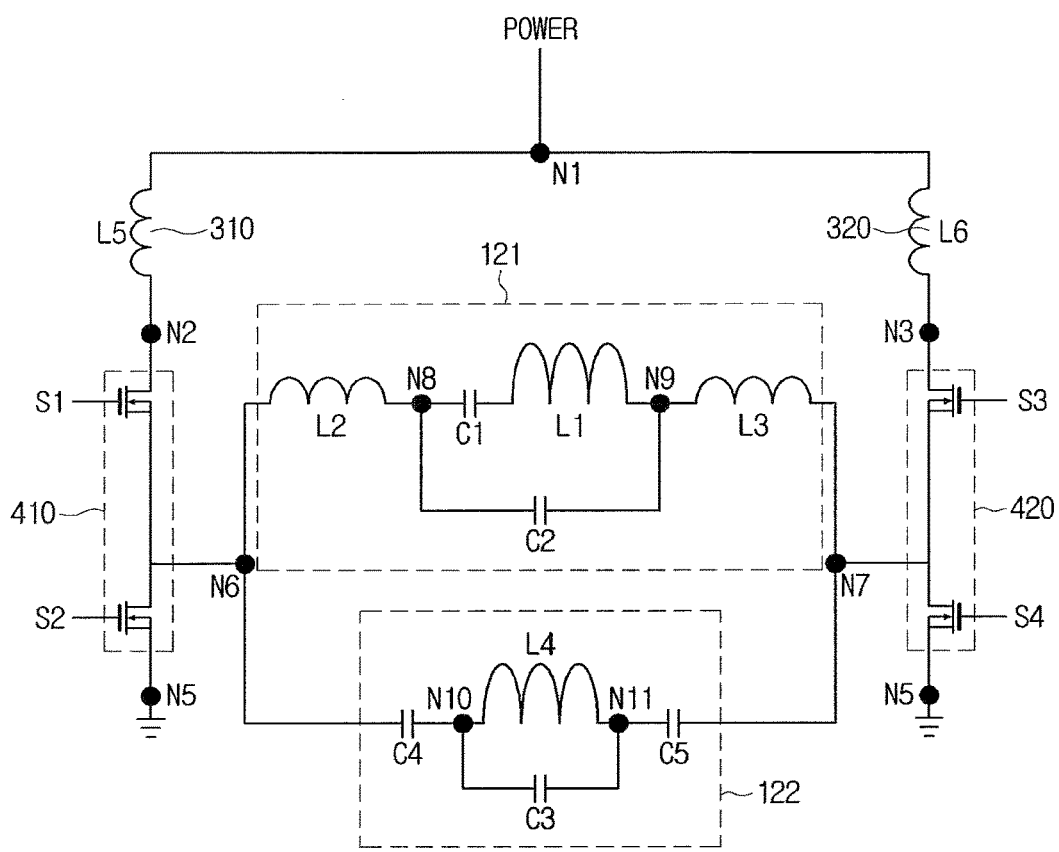
FIG. 9 is showing in detail a power converting unit and a transmission antenna system connected to the power converting unit according to an embodiment.

FIG. 9 is showing in detail a power converting unit and a transmission antenna system connected to the power converting unit according to an embodiment.

Referring to FIG. 9, each of the first and second high-frequency filtering units 310 and 320 may include the fifth and sixth inductors L5 and L6. Thus, each of the induction-type antenna system 121 and the resonance-type antenna system 122 may include at least one capacitor and at least one inductor. In addition, each of the first and second power converting switch units 410 and 420 may include at least one switching device S1 to S4. The switching device S1 to S4 is equivalently operated like either an open circuit or a short circuit according to the switch control signal form the control unit 131, so that a signal transmission path may be provided or a signal may be prevented from being transmitted therethrough.

Hereinafter, the connections of elements constituting the power converting unit 112 and the transmission antenna system 120 connected to the power converting unit 112 will be described. The induction-type antenna system 121 of the transmission antenna system 120 may include the first to third inductors L1 to L3 and the first and second capacitor C1 and C2. The first inductor L1 and the first capacitor C1, which are connected in series to each other, may be connected between the eighth and ninth nodes N8 and N9, and the second capacitor C2, which is connected between the eighth and ninth nodes N8 and N9, may be connected in parallel to the first inductor L1 and the first capacitor C1. The second inductor L2 may be connected between the sixth and eighth nodes N6 and N8 and the third inductor L3 may be connected between the seventh and ninth nodes N7 and N9. In addition, in the induction-type antenna system 121, the first inductor L1 may constitute the induction coil 121$b$ and the second and third inductors L2 and L3 may constitute the induction matching unit 121$a$.

The resonance-type antenna system 122 may include the third to fifth capacitors C3 to C5 and the fourth inductor L4. The fourth inductor L4 may be connected between the tenth and eleventh nodes N10 and N11, and the third capacitor C3, which is connected between the tenth and eleventh nodes N10 and N11, may be connected in parallel to the fourth inductor L4. The fourth capacitor C4 may be connected between the sixth and tenth nodes N6 and N10 and the fifth capacitor C5 may be connected between the seventh and eleventh nodes N7 and N11. In addition, the fourth inductor L4 of the resonance-type antenna system 122 may constitute the resonant coil 122$b$ and the third to fifth capacitors C3 to C5 may constitute the resonant matching unit 122$a$.

In addition, the first power converting switch unit 410 may include the first and second switches S1 and S2. The first switch S1 may be connected between the second and sixth nodes N2 and N6 and the second switch S2 may be connected between the fifth and sixth nodes N5 and N6. Reference power may be provided to the fifth node N5. The second power converting switch unit 420 may include the third and fourth switches S3 and S4. The third switch S3 may be connected between the third and seventh nodes N3 and N7 and the fourth switch S4 may be connected between the fifth and seventh nodes N5 and N7. The reference power may be provided to the fifth node N5.

Figure 10:
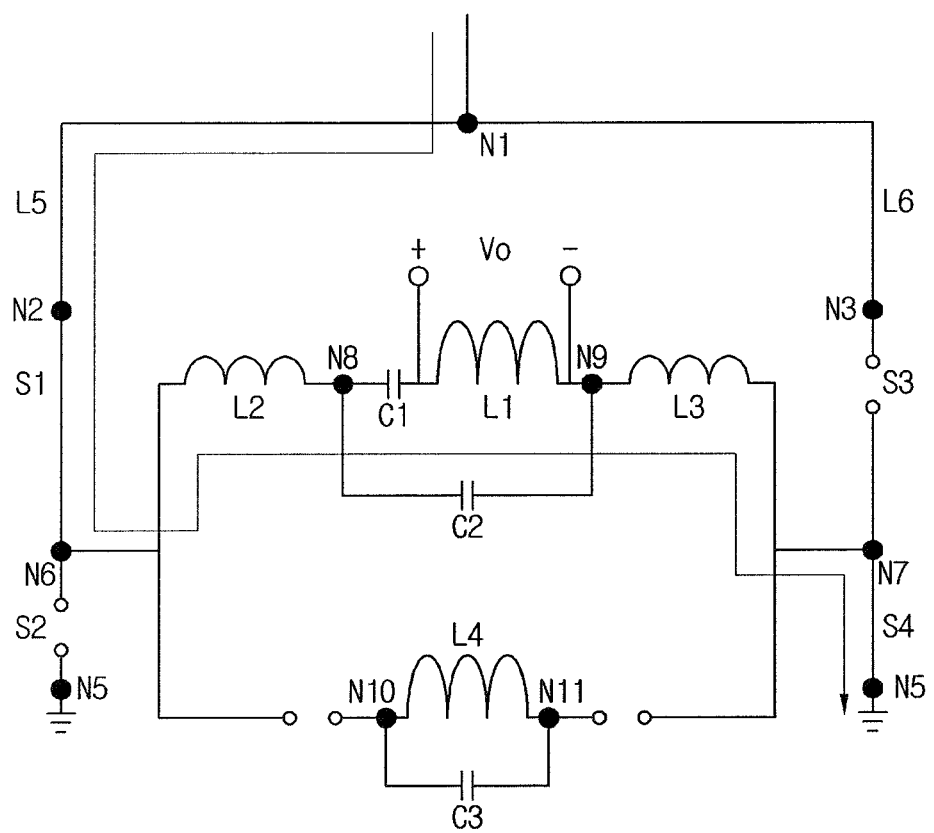
FIG. 10 is illustrating a forward operation of an induction-type antenna system.
Figure 11:
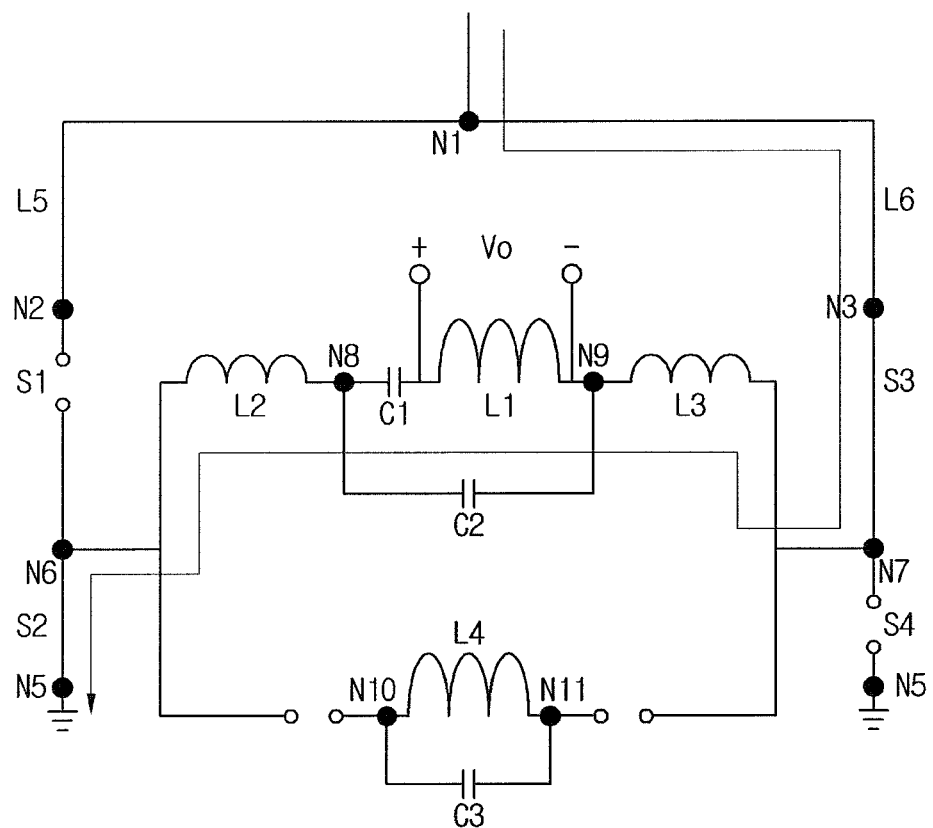
FIG. 11 is illustrating a reverse operation of an induction-type antenna system.
Figure 14:
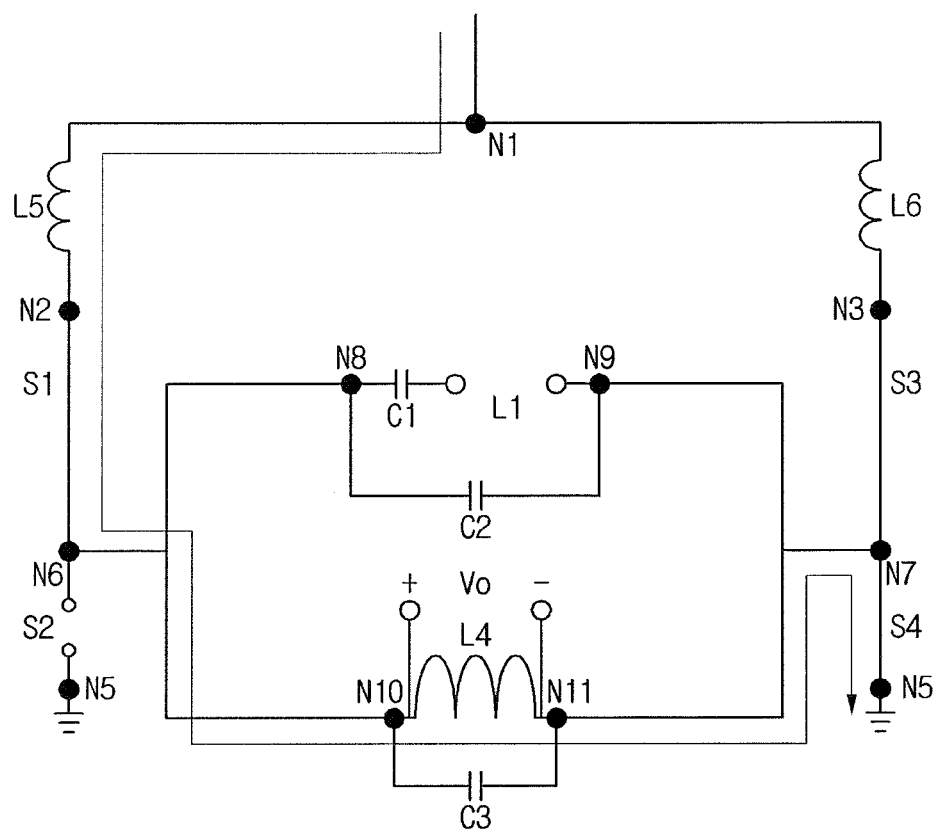
FIG. 14 is illustrating a forward operation of a resonance-type antenna system.
Figure 15:
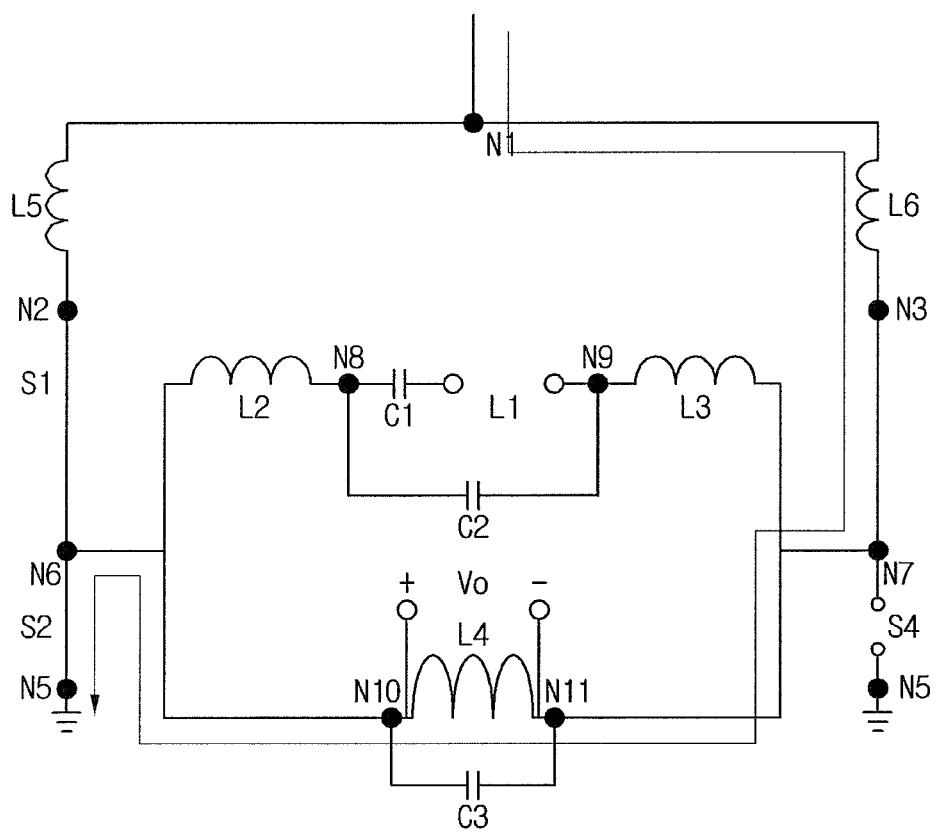
FIG. 15 is illustrating a reverse operation of a resonance-type antenna system.

FIG. 10 is illustrating a forward operation of an induction-type antenna system. FIG. 11 is illustrating a reverse operation of an induction-type antenna system. FIG. 14 is illustrating a forward operation of a resonance-type antenna system. FIG. 15 is illustrating a reverse operation of a resonance-type antenna system.

Examining the relationship of values of the devices, the second and third inductors L2 and L3 may have the same inductance and the first and second capacitors C1 and C2 may have the same capacitance. The inductance of the induction coil 121b may be set to be greater than that of the resonant coil 122b, and the capacitance of the third capacitor C3 may be set to be less than that of the fourth capacitor C4. The capacitance of the fourth capacitor C4 may be set to be less than that of the first capacitor C1. Hereinafter, it is assumed in the description of the embodiment that the devices have the following values as examples: L1=11.5 uH, L2=L3=1 uH, C1=200 nF, C2=200 nF, L5=L6=2.2 uH, C4=C5=270 pF, L4=2 uH, and C3=150 pF, and the devices satisfy the condition of 0.1 uH<L5=L6<5 uH.

<Operation of Induction-Type Antenna System>

Referring to FIGS. 10 and 11, the control unit 131 may control the power converting unit 112 according to the first operating frequency which is in the range of 100~350 kHz. The first and fourth switches S1 and S4 may be switched at the same phase, the second and third switches S2 and S3 may be switched at the same phase, and the first and second switches S1 and S2 may be switched at mutually opposite phases. Regarding the operating frequency in the above switching operation, the first operating frequency is defined as to have one cycle from a high level to a next high level or from a low level to a next low level when a PWM (Pulse Width Modulation), which is a square wave, alternates between high and low levels. The same phase signifies that the same high or low level is supplied to the first and fourth switches S1 and S4 or the second and third switches S2 and S3, and the opposite phase signifies that a low level is applied to the second switch S2 while a high level is applied to the first switch S1.

FIG. 10 is circuit diagram illustrating a forward operation in which the first and fourth switches S1 and S4 are turned on so that the first and fourth switches S1 and S4 are operated like a short circuit and the second and third switches S2 and S3 are turned off so that the second and third switches S2 and S3 are operated like an open circuit. FIG. 11 is a circuit diagram illustrating a reverse operation in which the first and fourth switches S1 and S4 are turned off so that the first and fourth switches S1 and S4 are operated like an open circuit and the second and third switches S2 and S3 are turned on so that the second and third switches S2 and S3 are operated like a short circuit. In this case, since the fourth and fifth capacitors C4 and C5 of the resonance-type antenna system 122 have capacitance of 270 pF, respectively, the fourth and fifth capacitors C4 and C5 have the high impedance of 2589 ohms according to the reactance of $1/(2\pi fC)$. Thus, the effect of the resonance-type antenna system 122 on the induction-type antenna system 121 may be neglected. In addition, the fifth and sixth inductors L5 and L6 constituting the first and second high-frequency filtering units 310 and 320 have low impedance of 2.83 ohms due to the reactance of $2\pi fL$, so that the fifth and sixth inductors L5 and L6 are operated like a short circuit. Thus, the effect of the first and second high-frequency filtering units 310 and 320 on the induction-type antenna system 121 may be neglected.

Referring to FIG. 10, in the forward operation according to the first operating frequency, the DC signal provided from the converter 111 may be converted into the AC signal via the first, second, sixth, seventh and fifth nodes N1, N2, N6, N7 and N5 and a forward output voltage Vo may be output to both terminals of the induction coil L1 of the induction-type antenna system 121. In this case, the resonance-type antenna system 122 may be operated like an open circuit.

Referring to FIG. 11, in the reverse operation according to the first operating frequency, the DC signal may be converted into the AC signal via the first, third, seventh, sixth and fifth nodes N1, N3, N7, N6 and N5 and a reverse output voltage −Vo may be output to both terminals of the induction coil L1 of the induction-type antenna system 121. In this case, the resonance-type antenna system 122 may be operated like an open circuit.

Figure 12:
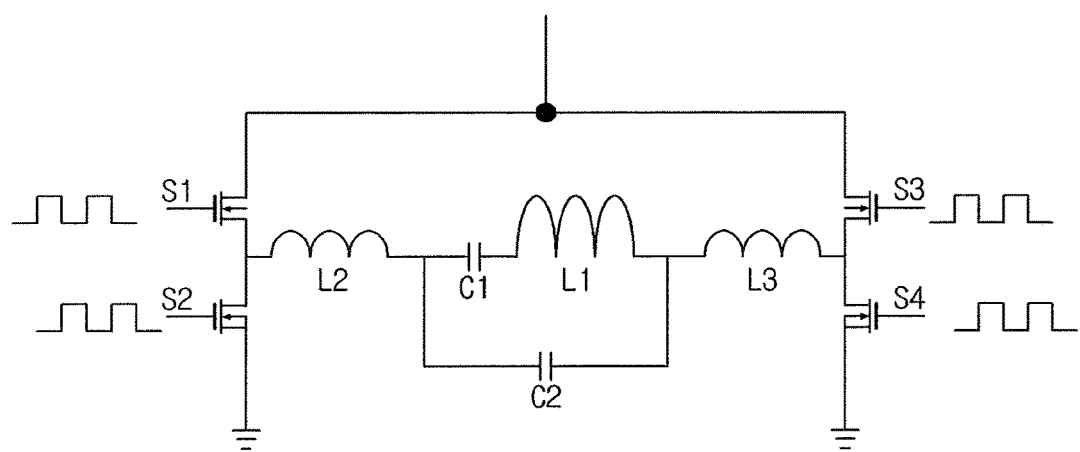
FIG. 12 is an equivalent circuit diagram of a power converting unit and a transmission antenna system at the first operating frequency.
Figure 13:
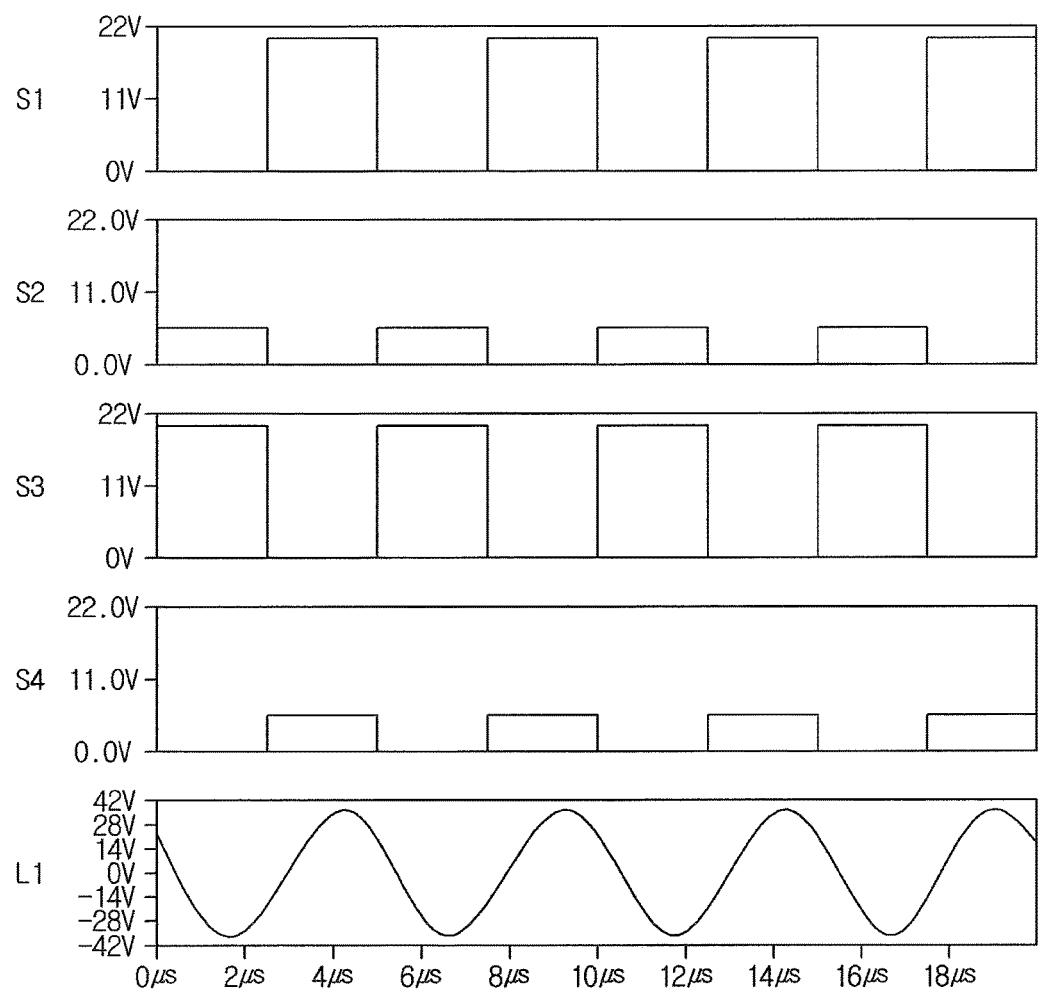
FIG. 13 is a waveform diagram illustrating the operations of the power converting unit and the transmission antenna system.

FIG. 12 is an equivalent circuit diagram of a power converting unit and a transmission antenna system at the first operating frequency. FIG. 13 is a waveform diagram illustrating the operations of the power converting unit and the transmission antenna system.

Referring to FIG. 12, the transmission control unit 131 may control the first and fourth switches S1 and S4 and the second and third switches S2 and S3, such that the first and fourth switches S1 and S4 and the second and third switches S2 and S3 are alternately operated according to the first operating frequency. Thus, the power converting unit 112 and the transmission antenna system 120 may operate as the equivalent circuit of FIG. 12, so that the wireless power transmission is performed in the magnetic induction scheme.

Referring to FIG. 13, the first and fourth switches S1 and S4 may have the same phase. The voltage applied to the first switch S1 may be in the range 11 V to 22 V and the voltage applied to the fourth switch S4 may be in the range of 0 V to 11 V. The second and third switches S2 and S3 may have the same phase which is opposite to that of the first and fourth switches S1 and S4. When The voltage applied to the first switch S2 is in the range 0 V to 11 V and the voltage applied to the third switch S3 is in the range of 11 V to 22 V, the voltage Vo between both terminals of the induction coil L1 may have an AC waveform having an amplitude in the range of 28 V to 42 V, so that the wireless power transmission may be performed in the magnetic induction scheme by the AC signal. Meanwhile, the voltage values mentioned above have only been proposed as examples and thus, may be varied according to a state of wireless power transmission.

<Operation of Resonance-Type Antenna System>

Referring to FIGS. 14 and 15, the control unit 131 may control the power converting unit 112 according to the second operating frequency which is equal to 6.78 MHz. The first and third switches S1 and S3 may be always turned on, the second and fourth switches S2 and S4 may be alternately switched at mutually opposite phases. Meanwhile, if the first and third switches S1 and S3 are N-channel MOSFETs, the first and third switches S1 and S3 may be always turned on by allowing the switch control signals applied to the first and third switches S1 and S3 to continuously have a high-level.

FIG. 14 is a circuit diagram illustrating a forward operation, where the first and third switches S1 and S3 are maintained in a turn-on state so that the first and third switches S1 and S3 are operated like a short circuit, the second switch S2 is turned off so that the second switch S2 is operated like an open circuit, and the fourth switch S4 is turned on so that the fourth switch S4 is operated like a short circuit. FIG. 15 is a circuit diagram illustrating a reverse operation, where the first and third switches S1 and S3 are maintained in a turn-on state so that the first and third switches S1 and S3 are operated like a short circuit, the second switch S2 is turned on so that the second switch S2 is operated like a short circuit, and the fourth switch S4 is turned off so that the fourth switch S4 is operated like an open circuit. In this case, since the first induction coil L1 of the induction-type antenna system 121 has inductance of 11.5 uH, the first inductance coil L1 has the high impedance of 1021 ohms according to the reactance of $2\pi fL$. Thus, the effect of the induction-type antenna system 121 on the resonance-type antenna system 122 may be neglected. In addition, the second and third inductors L2 and L3 have the low impedance of 43 ohms according to the reactance of $2\pi fL$, so that the second and third inductors L2 and L3 may be operated equivalently like a short circuit, thereby limiting the voltage to be applied to the first induction coil L1.

Referring to FIG. 14, in the forward operation according to the second operating frequency, the DC signal provided from the converter 111 may be converted into the AC signal via the first, second, sixth, seventh and fifth nodes N1, N2, N6, N7 and N5 and a forward output voltage Vo may be output to both terminals of the resonant coil L4 of the resonance-type antenna system 122. In this case, the induction-type antenna system 121 may be operated like an open circuit Referring to FIG. 15, in the reverse operation according to the second operating frequency, the DC signal provided from the converter 111 may be converted into the AC signal via the first, third, seventh, sixth and fifth nodes N1, N3, N7, N6 and N5 and a reverse output voltage −Vo may be output to both terminals of the resonant coil L4 of the resonance-type antenna system 122. In this case, the induction-type antenna system 121 may be operated like an open circuit.

Figure 16:
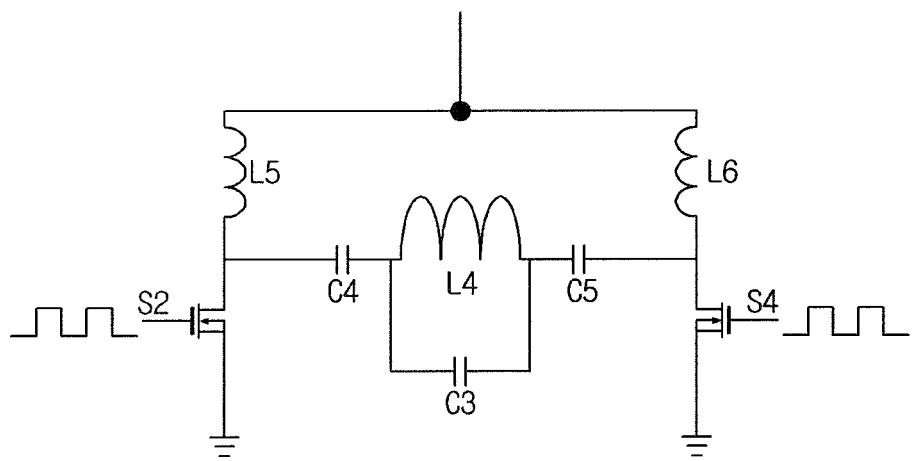
FIG. 16 is an equivalent circuit diagram of a power converting unit and a transmission antenna system at the second operating frequency.
Figure 17:
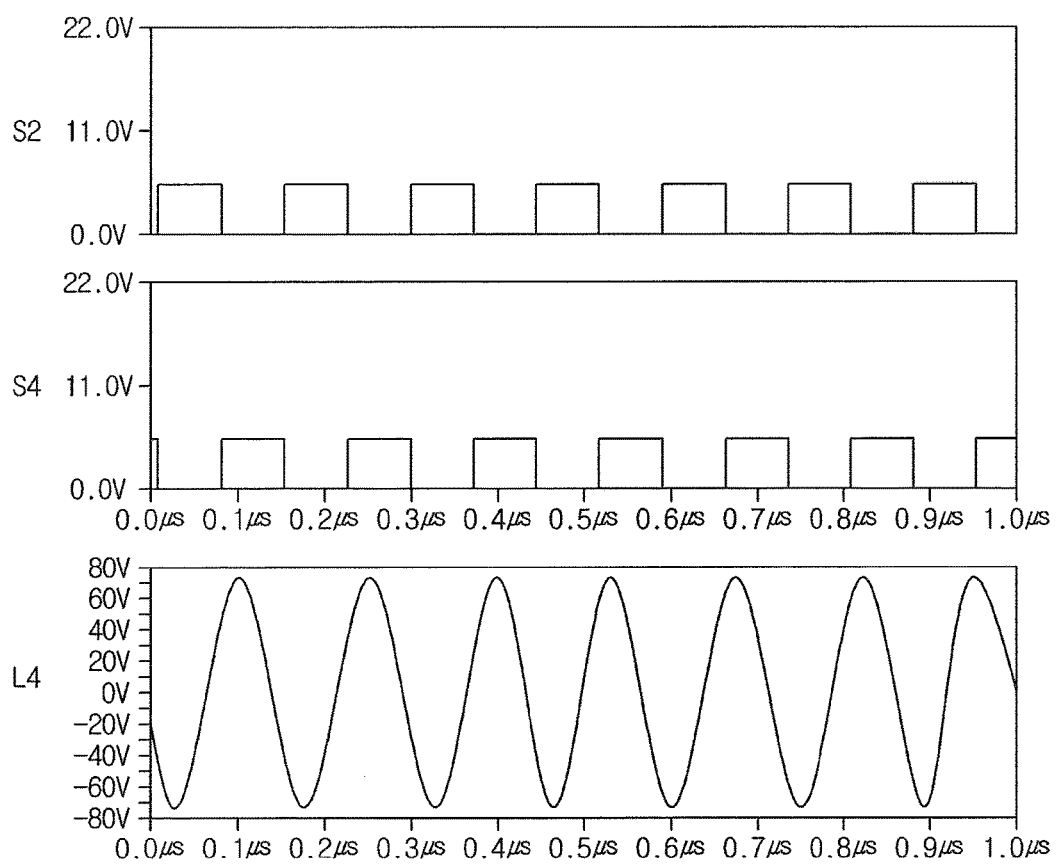
FIG. 17 is a waveform diagram illustrating the operations of the power converting unit and the transmission antenna system.

FIG. 16 is an equivalent circuit diagram of a power converting unit and a transmission antenna system at the second operating frequency. FIG. 17 is a waveform diagram illustrating the operations of the power converting unit and the transmission antenna system.

Referring to FIG. 16, the transmission control unit 131 may control the first and third switches S1 and S3 and the second and fourth switches S2 and S4, such that the first and third switches S1 and S3 and the second and fourth switches S2 and S4 are alternately operated according to the second operating frequency. Thus, the power converting unit 112 and the transmission antenna system 120 may operate as the equivalent circuit of FIG. 16, so that the wireless power transmission is performed in the magnetic resonance scheme.

Referring to FIG. 17, the first and third switches S1 and S3 may be maintained in a turn-on state. The voltage applied to the second switch S2 may be in the range of 0 V to 11 V and the voltage applied to the fourth switch S4 may be in the range of 0 V to 11 V. When the second and fourth switches S2 and S4 are operated at mutually different phases, the voltage Vo between both terminals of the resonant coil L4 may have an AC waveform having an amplitude in the range of 70 V to 80 V, so that the wireless power transmission may be performed in the magnetic resonance scheme by the AC signal. Meanwhile, the voltage values mentioned above have only been proposed as examples and thus, may be varied according to a state of wireless power transmission.

<Operation of Power Converting Unit and Transmission Antenna System>

Figure 18:
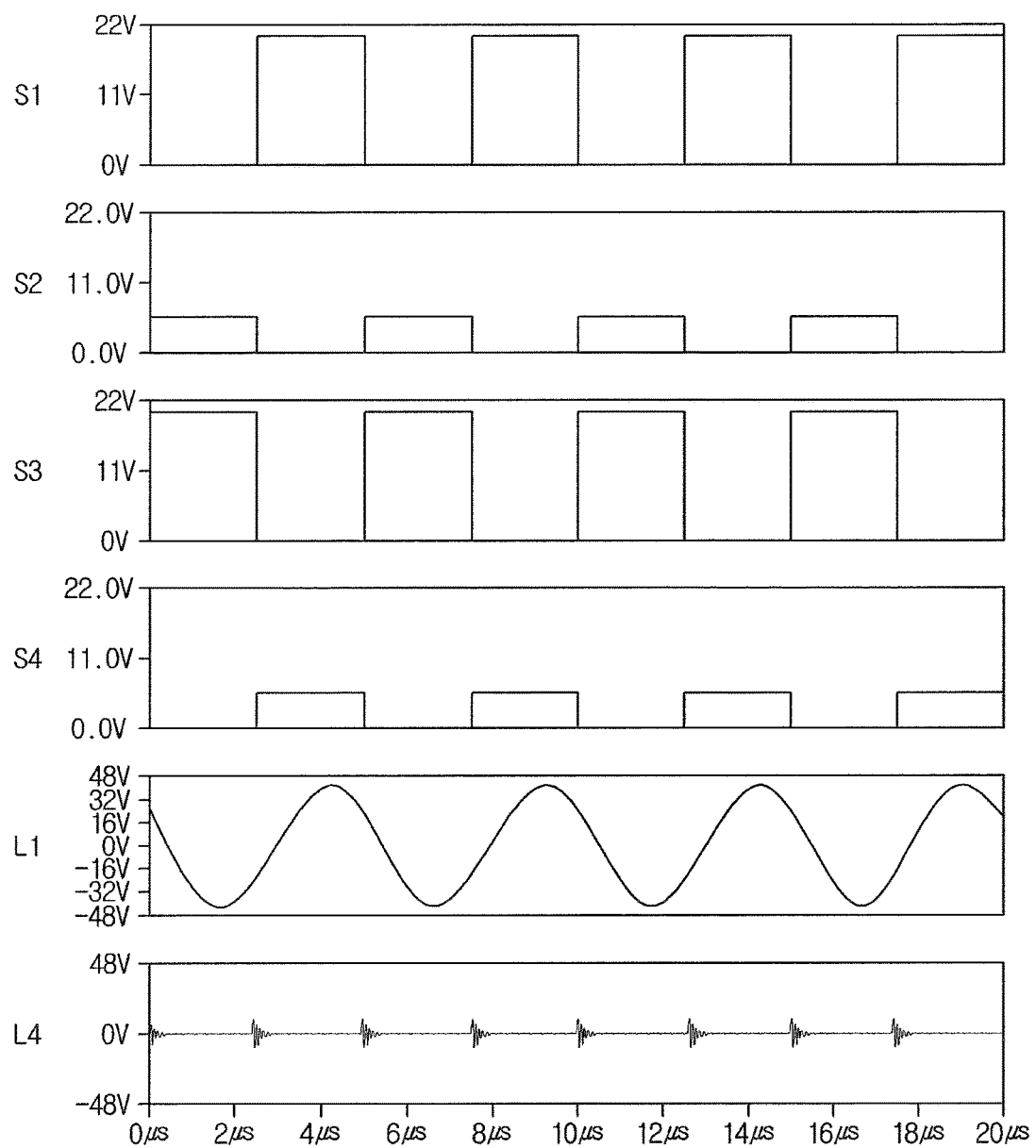
FIG. 18 is a waveform diagram showing a voltage between both terminals of a resonant coil of a resonance-type antenna system operated at the first operating frequency.
Figure 19:
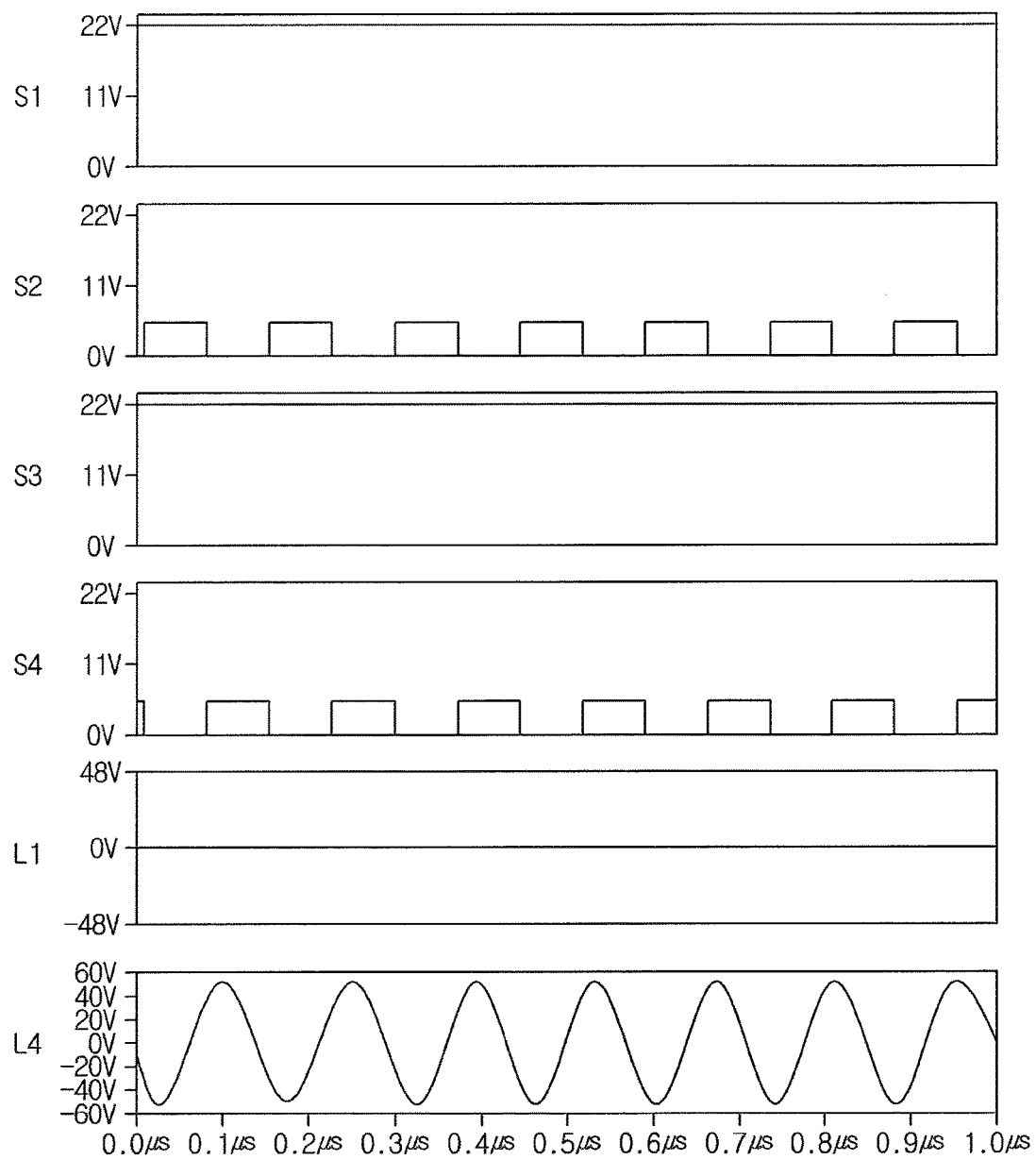
FIG. 19 is a waveform diagram showing a voltage between both terminals of an induction coil of an induction-type antenna system operated at the second operating frequency.

FIG. 18 is a waveform diagram showing a voltage between both terminals of a resonant coil of a resonance-type antenna system operated at the first operating frequency. FIG. 19 is a waveform diagram showing a voltage between both terminals of an induction coil of an induction-type antenna system operated at the second operating frequency.

Referring to FIG. 18, it is possible to wirelessly transmit power in a magnetic induction scheme according to the operation of generating the induced electromotive force of the induction-type antenna system 121 and the open-circuit operation of the resonance-type antenna system 122 when the transmission antenna system is operated at the first operating frequency. In this case, it is known that the zero voltage is formed between both terminals of the resonant coil L4 of the resonance-type antenna system 122. Therefore, it is known that the resonance-type antenna system 122 has little effect on the wireless power transmission in a magnetic induction scheme at the first operating frequency.

Referring to FIG. 19, it is possible to wirelessly transmit power in a magnetic resonance scheme according to the operation of generating the electric field or magnetic field of the resonance-type antenna system 122 when the transmission antenna system is operated at the second operating frequency. In this case, it is known that the zero voltage is formed between both terminals of the induction coil L1 of the induction-type antenna system 121. Therefore, it is known that the induction-type antenna system 121 has little effect on the wireless power transmission in a magnetic resonance scheme at the second operating frequency.

<Steps of Detecting Wireless Power Transfer System-Receiver and Transmitting Power>

Figure 20:
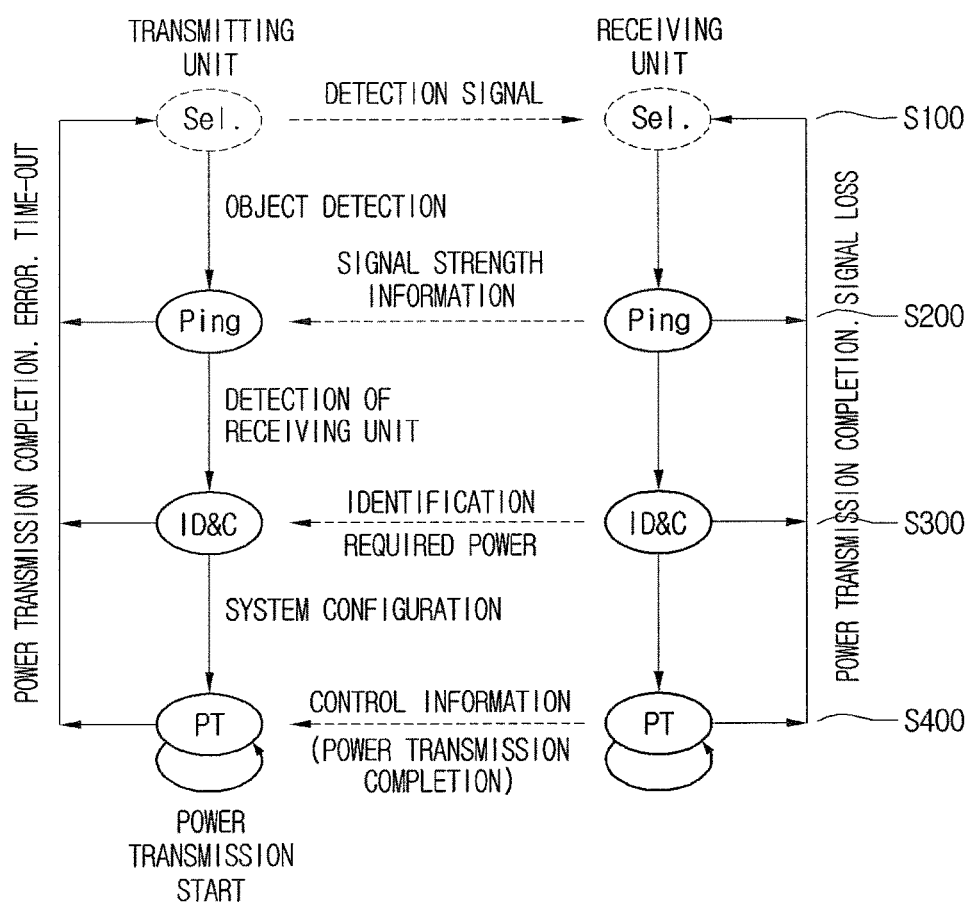
FIG. 20 is illustrating steps of detecting a wireless power transfer system-receiver to transmitting from a wireless power transfer system-charger to the wireless power transfer system-receiver in a wireless power transfer system according to an embodiment.

FIG. 20 is illustrating steps of detecting a wireless power transfer system-receiver to transmitting from a wireless power transfer system-charger to the wireless power transfer system-receiver in a wireless power transfer system according to an embodiment.

The control scheme may be divided into a step S100 of detecting the wireless power transfer system-receiver 200 (selection), a step S200 of confirming a response (ping), an identification and configuration step S300, and a step S400 of transmitting power.

In the step S100 of detecting the wireless power transfer system-receiver 200, the wireless power transfer system-charger 100 transmits a signal for detecting the existence of the wireless power transfer system-receiver 200 and waits for a response of the wireless power transfer system-receiver 200 to the signal.

In the step S200 of confirming a response, the wireless power transfer system-receiver 200 may transmit information about the strength of the signal and the wireless power transfer system-charger 100 may confirm the existence of the wireless power transfer system-receiver 200 by using the information. In this case, the transmission communication unit 132 of the wireless power transfer system-charger 100 may obtain, from the reception communication unit 251, information about the wireless power charging scheme of the wireless power transfer system-receiver 200, that is, whether the wireless power charging scheme of the wireless power transfer system-receiver 200 is the magnetic induction scheme or the magnetic resonance scheme.

In the identification and configuration step S300, the wireless power transfer system-charger 200 transmits information about identification and required power, configures power transmission and prepares the power transmission. In this case, the transmission control unit 131, which receives information about the wireless power transfer system-receiver 200 from the transmission communication unit 132 of the wireless power transfer system-charger 100, may prepare to control the power converting unit 112 at the first operating frequency when the wireless power transfer system-receiver 200 includes a coil for a magnetic induction scheme, and may prepare to control the power converting unit 112 at the second operating frequency when the wireless power transfer system-receiver 200 includes a coil for a magnetic induction scheme.

In the step S400 of transmitting power, the wireless power transfer system-receiver 200 transmits control information and starts to transmit power.

When a signal blocking or error occurs between the four steps, the process may take time out to return to the first step. In addition, when an error is detected during the power transmission or the wireless power transfer system-receiver 200 is out of the charging area or fully charged, the power transmission may be stopped and the process may return to the first step.

In addition, during the charging process, the control unit 131 may control the converter 111 to adjust the level of the DC signal according to the impedance matching or charging state, so that the level of the AC signal output from the power converting unit 112 may be controlled. In addition, the control unit 131 may control the frequency of the switch control signal of the power converting unit 112, so that the frequency and level of the AC signal output from the power converting unit 112 may be adjusted.

As described above, one of the induction-type antenna system 121 and the resonance-type antenna system 122 may operate at a specific frequency or in a specific frequency range under the control of the power converting unit 112. Thus, the circuit configuration is simplified to attenuate the complexity, so that the yield may be improved and the number of devices may be minimized, thereby reducing the cost.

<Disposing Relationship between Conduction Coil and Resonant Coil>

Figure 21:
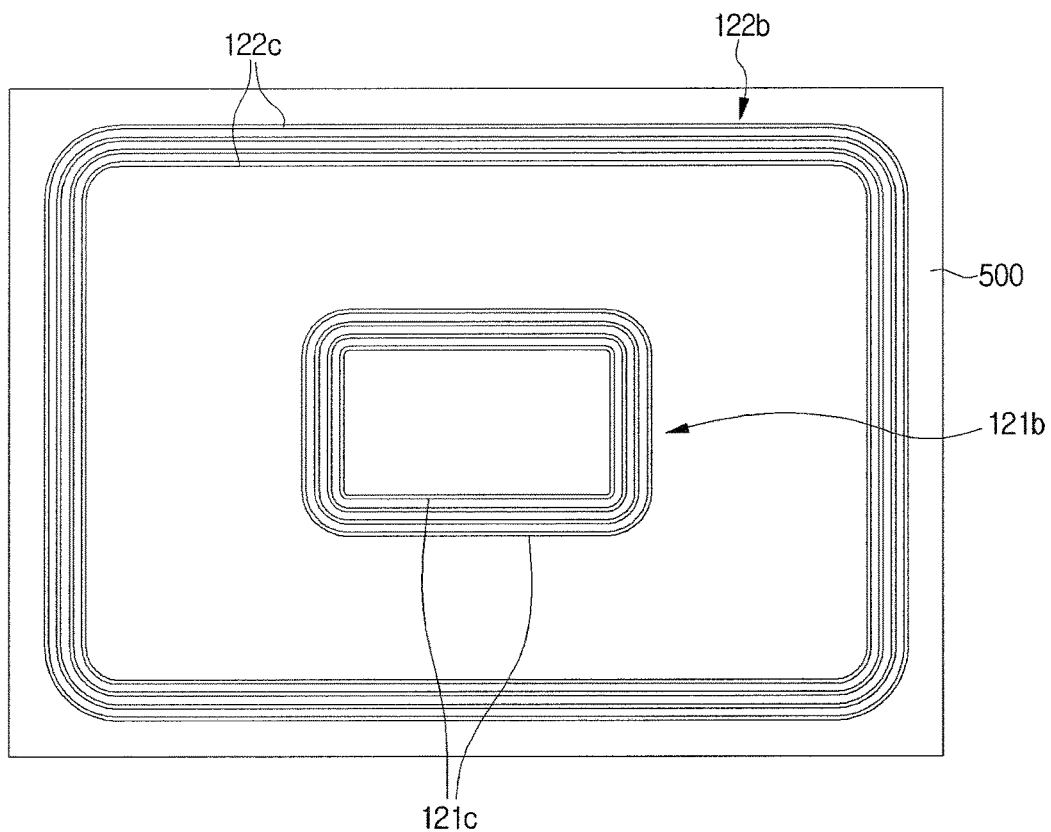
FIG. 21 is showing induction and resonant coils and a shielding member of a transmission antenna system according to a first embodiment.
Figure 22:
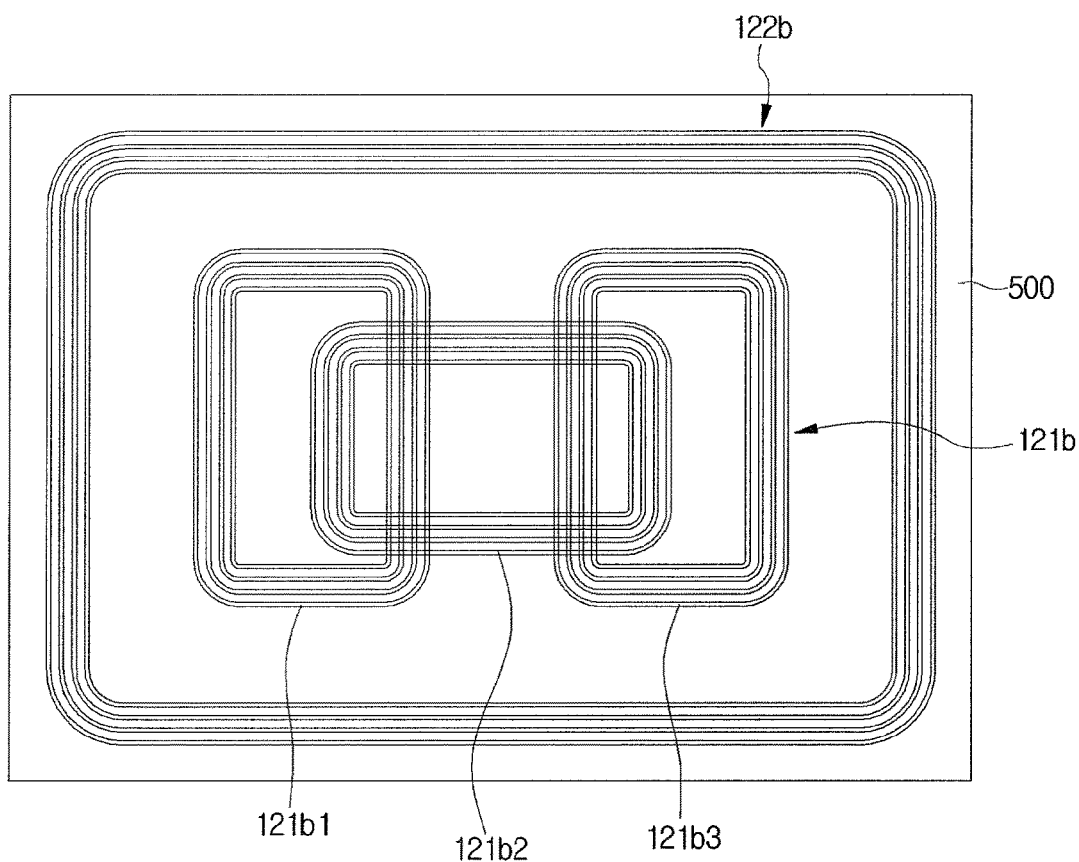
FIG. 22 is showing induction and resonant coils and a shielding member of a transmission antenna system according to a second embodiment.

FIG. 21 is showing induction and resonant coils and a shielding member of a transmission antenna system according to a first embodiment. FIG. 22 is showing induction and resonant coils and a shielding member of a transmission antenna system according to a second embodiment.

Referring to FIGS. 21 and 22, the transmission antenna system 120 according to each of the first and second embodiments may include an induction coil 121b, a resonant coil 122b and a shield member 500.

As shown in FIGS. 21 and 22, the resonant coil 122b may include a plurality of resonant coil wires 122c. The resonant coil wires 122c may be sequentially arranged inward from an outside and may be formed in one turn. For example, each of the resonant coil wires 122c may extend in a circular or rectangular shape. The radius of the resonant coil wire 122c may become smaller in the inward direction. In addition, the resonant coil wire 122c may be arranged at a regular interval. Further, the interval between adjacent resonant coil wires 122c may be gradually enlarged or narrowed in the inward direction.

As shown in FIG. 21, the induction coil 121b may be operated in a magnetic induction scheme and may include a plurality of induction coil wires 121c. The induction coil wires 121c may be arranged sequentially and inward from an outside and may be formed in one turn. For example, each of the induction coil wires 121c may extend in a circular or rectangular shape. The radius of the induction coil wire 121c may become smaller in the inward direction. In addition, the induction coil wire 122c may be arranged at a regular interval. Further, the interval between adjacent induction coil wires 121c may be gradually enlarged or narrowed in the inward direction.

In addition, as shown in FIG. 22, the induction coil 121b may include a plurality of induction unit coils 121b1 to 121b3. One of the induction unit coils 121b1 to 121b3 may be interposed between the other two coils.

<Impedance Relationship between Conduction Coil and Resonant Coil>

Figure 23:
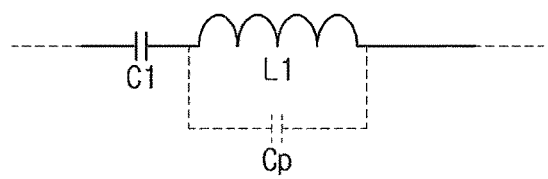
FIG. 23 is an equivalent circuit diagram of the induction coil of FIG. 21.
Figure 24:
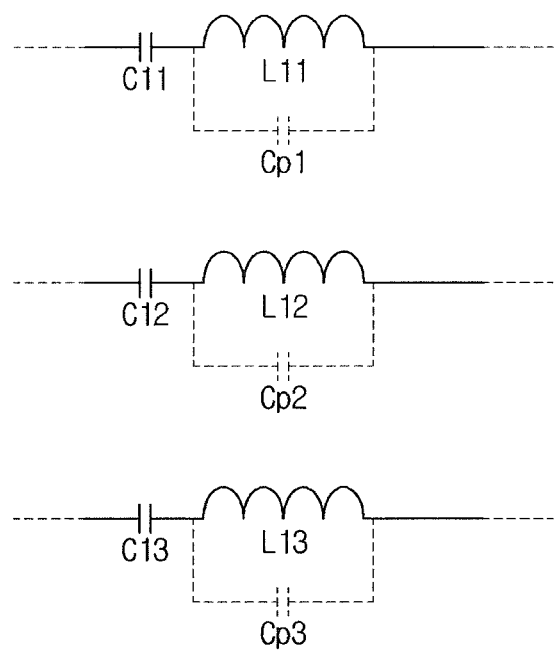
FIG. 24 is an equivalent circuit diagram of the induction coil of FIG. 22.
Figure 26:
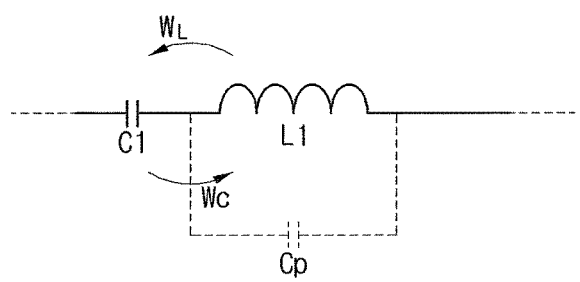
FIG. 26 is illustrating a series resonance phenomenon of FIG. 23.
Figure 27:
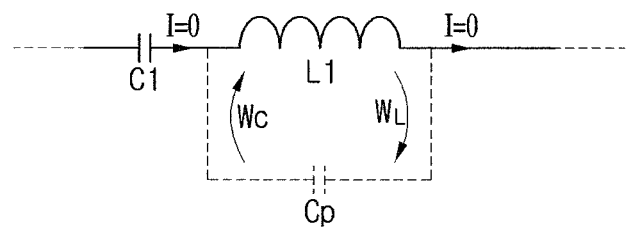
FIG. 27 is illustrating a parallel resonance phenomenon of FIG. 25.

FIG. 23 is an equivalent circuit diagram of the induction coil of FIG. 21. FIG. 24 is an equivalent circuit diagram of the induction coil of FIG. 22. FIG. 26 is a view illustrating a series resonance phenomenon of FIG. 23. FIG. 27 is a view illustrating a parallel resonance phenomenon of FIG. 25.

Referring to FIGS. 23 and 24, according to the first embodiment, the first inductor L1 of the induction coil 121b may be connected to the first capacitor C1 of the induction matching unit 121a and a parasitic capacitor Cp as an equivalent of parasitic capacitance may be connected to both terminals of the first inductor L1.

Figure 28:
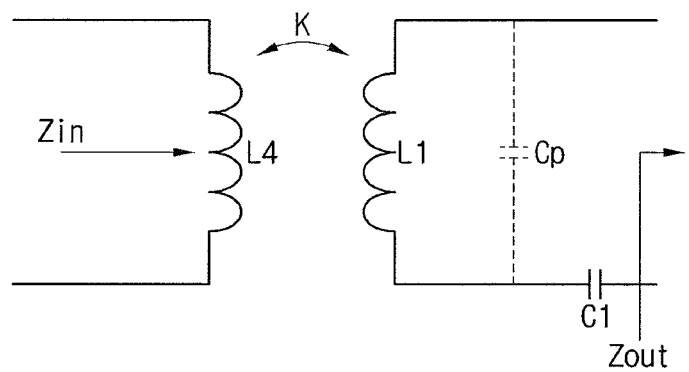
FIG. 28 is an equivalent circuit diagram of resonant and induction coils according to an embodiment.

Referring to FIGS. 24 and 28, according to the second embodiment, each equivalent circuit of the induction unit coils 121b1 to 121b3 constituting the induction coil 121b may include a first inductor L11, L12 or L13 and a parasitic capacitor Cp1, Cp2 or Cp3 connected in parallel to the first inductor L11, L12 or L13.

The parasitic capacitance may be varied according the interval and area between the wires constituting the induction coil 121b and in detail, may satisfy the following Equation 1:

$$C_P = \varepsilon \frac{LT}{D} \qquad \text{[Equation 1]}$$

Where D denotes an interval between the induction coil wires 121c, L denotes a length of the induction coil wires 121c and T denotes a thickness of the induction coil wires 121c.

Figure 25:
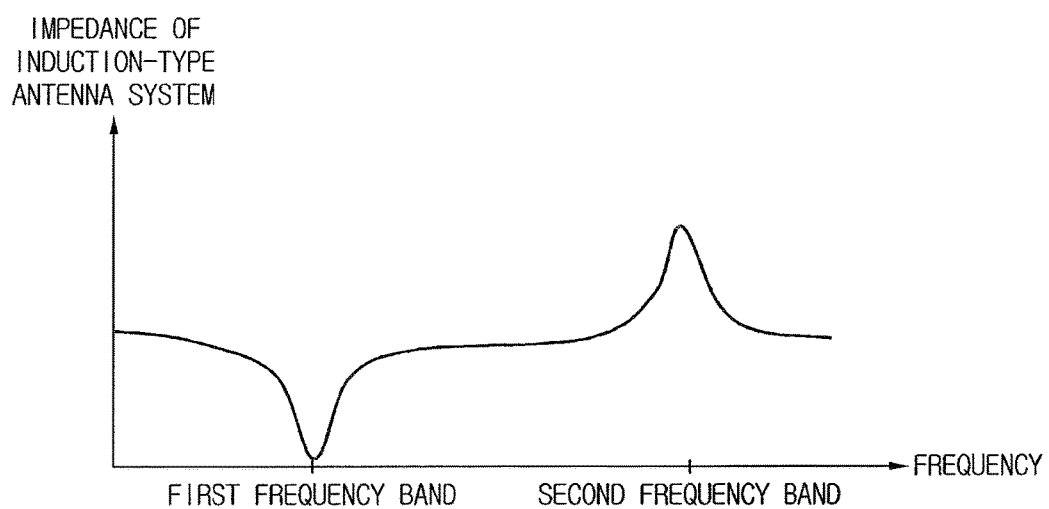
FIG. 25 is a graph illustrating the frequency impedance characteristic of an induction coil of a transmission antenna system according to the first and second embodiments.

FIG. 25 is a graph illustrating the frequency impedance characteristic of an induction coil of a transmission antenna system according to the first and second embodiments.

Referring to FIG. 25, the induction coil 121b may resonate in each of the first and second frequency bandwidths.

First, examining the operation of the induction coil 121b in the first frequency band, the first inductor L1, L11, L12 and L13 of the induction coil 121b may resonate with the first capacitor C1 in the first frequency band. In this case, the first inductors L1, L11, L12 and L13 and the first capacitors C1, C11, C12 and C13 may be in a series resonance state so that energy is repeatedly exchanged. Thus, the first inductors L1, L11, L12 and L13 and the first capacitors C1, C11, C12 and C13 may be expressed as a short circuit and the impedance may be minimized. In order to allow the series resonance to occur in the first frequency band, the inductance of the first inductor L1, L11, L12 and L13 and the capacitance of the first capacitor C1, C11, C12 and C13 may be controlled.

In addition, examining the operation of the induction coil 121b in the first frequency band, the first inductor L1, L11, L12 and L13 of the induction coil 121b may resonate with the parasitic capacitor Cp, Cp1, Cp2 and Cp3 in the second frequency band. In this case, the first inductors L1, L11, L12 and L13 and the parasitic capacitors Cp, Cp1, Cp2 and Cp3 may be in a parallel resonance state so that energy is repeatedly exchanged. Thus, the first inductors L1, L11, L12 and L13 and the parasitic capacitors Cp, Cp1, Cp2 and Cp3 may be expressed as an open circuit and the impedance may be maximized. In order to allow the parallel resonance to occur in the second frequency band, the inductance of the first inductor L1, L11, L12 and L13 and the capacitance of the parasitic capacitor Cp, Cp1, Cp2 and Cp3 may be controlled by adjusting the variable of Equation 1.

Meanwhile, the first frequency band may include a frequency corresponding to the first operating frequency used to wirelessly transmit power in a magnetic induction scheme by controlling the power converting unit 112. That is, when the power converting unit 112 is controlled with the first operating frequency, the first frequency band may be set as the first operating frequency or a frequency approximate to the first operating frequency. In this case, the first operating frequency may be in the range of 100 kHz to 350 kHz and thus, the first frequency band may include a frequency in the range of 100 kHz to 350 kHz or an approximate frequency to the range of 100 kHz to 350 kHz.

In addition, the second frequency band may include a frequency corresponding to the second operating frequency used to wirelessly transmit power in a magnetic resonance scheme by controlling the power converting unit 112. That is, when the power converting unit 112 is controlled with the second operating frequency, the second frequency band may be set as the second operating frequency or a frequency approximate to the second operating frequency. In this case, the second operating frequency may be equal to 6.78 MHz and thus, the second frequency band may be equal to 6.78 MHz or an approximate frequency to 6.78 MHz.

As described above, when power is wirelessly transmitted in a magnetic resonance scheme by controlling the power converting unit 112 with the second operating frequency, the induction coil 121b may resonate with the parasitic capacitor Cp to have the maximum impedance. Thus, the effect of the induction-type antenna system 121 on the resonance-type antenna system 122 may be minimized and at the same time, the power loss caused by the induction-type antenna system 121 may be minimized.

FIG. 28 is an equivalent circuit diagram of resonant and induction coils according to an embodiment.

Hereinafter, the principle of minimizing the power loss caused by the induction-type antenna system 121 when power is wirelessly transmitted in a magnetic resonance scheme by controlling the power converting unit 112 with the second operating frequency will be described with reference to FIG. 28.

The impedance viewed from the resonant coil toward the induction coil may be expressed as following Equation 2:

$$Z_{in} = Z_{11} + Z_r = j\omega L_4 + \frac{k^2 L_4 L_1 \omega}{Z_{out} + \frac{j\omega L_1}{1 - \omega^2 L_1 C_P}} \quad \text{[Equation 3]}$$

Where Zin is input impedance viewed from the resonant coil 122b toward the induction-type antenna system 121, Z11 is induction impedance of the resonant coil 122b, Zr is magnetic impedance of the resonant coil 122b, Zr is reflective impedance of the induction-type antenna system 121 reflected toward the resonant coil 122b according to the magnetic coupling of the resonant coil 122b and the induction coil 121b, k is a coupling coefficient corresponding to a degree of the magnetic coupling of the resonant coil 122b and the induction coil 121b, Zout is impedance viewed from the induction coil 121b toward the induction matching unit 121a, and w is the frequency of a switching signal of the power converting unit 112.

When the power converting unit 112 is operated with the second operating frequency, that is, w=6.78 MHz and the second frequency band, that is, the parallel resonant frequency of the induction coil 121b and the parasitic capacitor Cp corresponds to the second operating frequency, the reflective impedance Zr converges to 0 (zero) according to following Equation 3, so that the input impedance Zin may become the magnetic impedance Z11:

$$Z_{in} = Z_{11} + Z_r = j\omega L_4 + \left( \frac{k^2 L_4 L_1 \omega}{Z_{out} + \left(\frac{j\omega L_1}{(1-\omega^2 L_1 C_P = 0)} = \infty\right)} = 0 \right) = \quad \text{[Equation 3]}$$
$$Z_{11} = Z_{in}$$

As described above, when the second frequency band corresponds to the second operating frequency and power is wirelessly transmitted in a magnetic resonance scheme, the input impedance Zin is equal to the impedance generated when the resonant coil 121b is not magnetically coupled to the induction coil 122b, so that the power loss caused by the induction coil 122b is minimized. In addition, when power is wirelessly transmitted in the magnetic resonance scheme, the effect of the induction coil 121b may be minimized so that the interference between the coils 121b and 122b may be removed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transfer system-charger for wireless power transmission, the wireless power transfer system-charger comprising:
   a power converting unit to convert DC signals on a first node and a fifth node into AC signals and output the AC signals to a sixth node and a seventh node;
   a control unit to control the power converting unit; and
   a transmission antenna system connected between the sixth nod and the seventh node,
   wherein the power converting unit comprises:
      a first high-frequency filtering unit connected between the first node and a second node;
      a second high-frequency filtering unit connected between the first node and a third node;
      a first power converting switch unit including a first switch connected between the second node and the sixth node, and a second switch connected between the sixth node and the fifth node; and
      a second power converting switch unit including a third switch connected between the third node and the seventh node, and a fourth switch connected between the seventh node and the fifth node,
      wherein the first high-frequency filtering unit includes a fifth inductor and the second high-frequency filtering unit includes a sixth inductor.

2. The wireless power transfer system-charger of claim 1, wherein the transmission antenna system includes an induction-type antenna system and a resonance-type antenna system connected in parallel to the induction-type antenna system.

3. The wireless power transfer system-charger of claim 2, wherein the control unit controls the first and fourth switches to be switched into a same phase, the second and third switches to be switched into a same phase, and the first and second switches to be switched into opposite phases based on a first operating frequency.

4. The wireless power transfer system-charger of claim 3, wherein the first operating frequency is in a range of 100 kHz to 350 kHz, and
 power is transmitted from the induction-type antenna system in a magnetic induction scheme.

5. The wireless power transfer system-charger of claim 2, wherein the control unit controls the first and third switches to be maintained in a turn-on state, and controls the second and third switches to be switched into mutually opposite phases.

6. The wireless power transfer system-charger of claim 5, wherein the second operating frequency is equal to 6.78 MHz, and
 power is transmitted from the resonance-type antenna system in a magnetic resonance scheme.

7. The wireless power transfer system-charger of claim 2, wherein the induction-type antenna system includes an induction coil and an induction matching unit, and
 the induction matching unit includes:
 a first capacitor connected between one end of the induction coil and an eighth node;
 a second capacitor connected between a ninth node which is an opposite end of the induction coil and the eighth node;
 a second inductor connected between the sixth node and the eighth node; and
 a third inductor connected between the seventh node and the ninth node.

8. The wireless power transfer system-charger of claim 7, wherein the resonance-type antenna system includes a resonant coil and a resonance matching unit, and
 the resonance matching unit includes:
 a third capacitor connected in parallel to the resonant coil connected between a tenth node and an eleventh node;
 a fourth capacitor connected between the sixth node and the tenth node; and
 a fifth capacitor connected between the seventh node and the eleventh node.

9. The wireless power transfer system-charger of claim 8, wherein the second inductor has an inductance value equal to an inductance value of the third inductor.

10. The wireless power transfer system-charger of claim 8, wherein the first capacitor has capacitance equal to capacitance of the second capacitor.

11. The wireless power transfer system-charger of claim 9, wherein the fourth capacitor has capacitance equal to capacitance of the fifth capacitor.

12. The wireless power transfer system-charger of claim 8, wherein the induction coil has inductance greater than inductance of the resonant coil.

13. The wireless power transfer system-charger of claim 11, wherein the third capacitor has capacitance less than capacitance of the fourth capacitor, and the fourth capacitor has capacitance less than capacitance of the first capacitor.

14. The wireless power transfer system-charger of claim 1, wherein the fifth and sixth inductors have inductance in range of 0.1 uH to 5 uH.

\* \* \* \* \*